(12) United States Patent
    Yano et al.

(10) Patent No.: US 11,099,041 B2
(45) Date of Patent: Aug. 24, 2021

(54) INFORMATION PROCESSING DEVICE AND INFORMATION PROCESSING METHOD

(71) Applicant: FUJITSU LIMITED, Kanagawa (JP)

(72) Inventors: Ai Yano, Kawasaki (JP); Ryuichi Matsukura, Kawasaki (JP); Yuki Nishiguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 846 days.

(21) Appl. No.: 15/819,737

(22) Filed: Nov. 21, 2017

(65) Prior Publication Data

US 2018/0164133 A1    Jun. 14, 2018

(30) Foreign Application Priority Data

Dec. 12, 2016    (JP) .............. JP2016-240532

(51) Int. Cl.
    *G01D 18/00*     (2006.01)
    *H04W 84/18*     (2009.01)
    *G08C 17/02*     (2006.01)
    *G08C 15/00*     (2006.01)
    *G08C 17/00*     (2006.01)
    *G08C 25/00*     (2006.01)
    *H04Q 9/00*      (2006.01)

(52) U.S. Cl.
    CPC .............. *G01D 18/00* (2013.01); *G08C 15/00* (2013.01); *G08C 17/00* (2013.01); *G08C 17/02* (2013.01); *G08C 25/00* (2013.01); *H04Q 9/00* (2013.01); *H04W 84/18* (2013.01); *H04Q 2209/40* (2013.01)

(58) Field of Classification Search
    CPC ....... G01D 18/00; H04W 84/18; G08C 17/02; G08C 15/00; G08C 17/00; G08C 25/00; H04Q 9/00; H04Q 2209/40
    See application file for complete search history.

(56) References Cited

U.S. PATENT DOCUMENTS

2008/0031139 A1    2/2008    Muro et al.
2016/0337167 A1    11/2016   Kawato

FOREIGN PATENT DOCUMENTS

JP    2008-42458       2/2008
WO    2015/107574      7/2015

*Primary Examiner* — Elias Desta
(74) *Attorney, Agent, or Firm* — Fujitsu Patent Center

(57) ABSTRACT

An information processing device includes: a memory; and a processor configured to: decide an acquisition method of acquiring data using a sensor node; acquire measurement data measured at the sensor node and performance data relating to performance of the sensor node according to the decided acquisition method; determine a presence or absence of occurrence of an anomaly based on the acquired measurement data and/or the acquired performance data; and divide an appearance range of data values of the performance data into level ranges indicating a degree of quality of the data values and store the level ranges in a storage unit, wherein the processor is configured to decide a level range including a data value of the acquired performance data by referring to the storage unit, and decide the acquisition method based on a combination of the decided level range and the presence or absence of occurrence of the anomaly.

14 Claims, 17 Drawing Sheets

FIG. 4

<PERFORMANCE VALUE DB 30>

| NODE ID | TIME STAMP | RSSI | LQ | RESPONSE TIME | REMAINING BATTERY CAPACITY | ... |
|---|---|---|---|---|---|---|
| 1000123A01 | 2016/1/1 00:00:00.000 | -53 | 254 | 26.77 | 66 | ... |
| | 2016/1/1 00:00:00.100 | -55 | 251 | 26.39 | | ... |
| | 2016/1/1 00:00:00.200 | -56 | 252 | 23.98 | | ... |
| | 2016/1/1 00:00:00.300 | -54 | 253 | 26.82 | | ... |
| | 2016/1/1 00:00:00.400 | -65 | 246 | 25.29 | | ... |
| | 2016/1/1 00:00:00.500 | -54 | 244 | 25.97 | | ... |
| | ... | ... | ... | ... | ... | ... |

| NODE ID | TIME STAMP | RSSI | LQ | RESPONSE TIME | CPU UTILIZATION | MEMORY USAGE RATE | ... |
|---|---|---|---|---|---|---|---|
| 0258000173 | 2016/1/1 00:00:00.000 | -50 | 255 | 66.95 | 47 | 58 | ... |
| | 2016/1/1 00:00:00.100 | -52 | 255 | 66.77 | | | ... |
| | 2016/1/1 00:00:00.200 | -43 | 255 | 66.25 | | | ... |
| | 2016/1/1 00:00:00.300 | -51 | 255 | 65.63 | | | ... |
| | 2016/1/1 00:00:00.400 | -52 | 246 | 68.91 | | | ... |
| | 2016/1/1 00:00:00.500 | -53 | 248 | 63.90 | | | ... |
| | ... | ... | ... | ... | ... | ... | ... |

FIG. 6

<MEASUREMENT VALUE DB 32>

| NODE ID | TIME STAMP | TEMPER-ATURE | HUMIDITY | ... |
|---|---|---|---|---|
| 1000123A01 | 2016/1/1 00:00:00.000 | 6.4 | 74 | ... |
| | 2016/1/1 00:00:01.000 | 6.4 | 74 | ... |
| | 2016/1/1 00:00:02.000 | 6.4 | 74 | ... |
| | 2016/1/1 00:00:03.000 | 6.4 | 74 | ... |
| | 2016/1/1 00:00:04.000 | 6.4 | 74 | ... |
| | 2016/1/1 00:00:05.000 | 6.3 | 73 | ... |
| | ... | ... | ... | ... |

| NODE ID | TIME STAMP | WATER LEVEL | GAS CON-CENTRATION | ... |
|---|---|---|---|---|
| 0258000173 | 2016/1/1 00:00:00.000 | 0.3 | 1.2 | ... |
| | 2016/1/1 00:00:01.000 | 0.3 | 1.2 | ... |
| | 2016/1/1 00:00:02.000 | 0.3 | 1.2 | ... |
| | 2016/1/1 00:00:03.000 | 0.3 | 1.2 | ... |
| | 2016/1/1 00:00:04.000 | 0.3 | 1.2 | ... |
| | 2016/1/1 00:00:05.000 | 0.3 | 1.2 | ... |
| | ... | ... | ... | ... |

FIG. 7A

<MEASUREMENT VALUE DB 32>

| NODE ID | TIME STAMP | TEMPER-ATURE | HUMIDITY | ... |
|---|---|---|---|---|
| 1000123A01 | 2016/1/1 00:00:00.000 | 6.4 | 74 | ... |
| | 2016/1/1 00:00:01.000 | 6.4 | 74 | ... |
| | 2016/1/1 00:00:02.000 | 6.4 | 74 | ... |
| | 2016/1/1 00:00:03.000 | 6.4 | 74 | ... |
| | 2016/1/1 00:00:04.000 | | | ← ACQUISITION FAILED |
| | 2016/1/1 00:00:05.000 | 6.3 | 73 | ... |
| | ... | ... | ... | ... |

FIG. 7B

<PERFORMANCE VALUE DB 30>

| NODE ID | TIME STAMP | RSSI | LQ | RESPONSE TIME | REMAINING BATTERY CAPACITY | ... |
|---|---|---|---|---|---|---|
| 1000123A01 | 2016/1/1 00:00:00.000 | −53 | 254 | 26.77 | 66 | ... |
| | 2016/1/1 00:00:00.100 | −55 | 251 | 26.39 | | ... |
| | 2016/1/1 00:00:00.200 | −56 | 252 | 23.98 | | ... |
| | 2016/1/1 00:00:00.300 | −54 | 253 | 26.82 | | ... |
| | 2016/1/1 00:00:00.400 | −65 | 246 | 25.29 | | ... |
| | 2016/1/1 00:00:00.500 | −54 | 244 | 25.97 | | ... |
| | ... | ... | ... | ... | | ... |

LESS THAN THRESHOLD VALUE (−60)

< PERFORMANCE LEVEL TABLE 34 >

| PERFORMANCE VALUE | | GOOD | BAD |
|---|---|---|---|
| HARDWARE PERFORMANCE | CPU LOAD | < A | A < |
| | MEMORY USAGE RATE | < B | B < |
| | ... | ... | ... |
| SOFTWARE PERFORMANCE | INTERNAL PROCESSING TIME | < G | G < |
| | ... | ... | ... |
| COMMUNICATION PERFORMANCE | RSSI | I < | < I |
| | LQ | J < | < J |
| | PER/BER | < K | K < |
| | RESPONSE TIME | < L | L < |
| | NUMBER OF RETRANSMISSIONS | < M | M < |
| | ... | ... | ... |

<NORMAL DISTRIBUTION>

FIG. 10

<ACQUISITION METHOD TABLE 36>

| PRESENCE OR ABSENCE OF ANOMALY | | | ABSENT | | PRESENT | |
|---|---|---|---|---|---|---|
| PERFORMANCE VALUE | | | GOOD | BAD | GOOD | BAD |
| HARDWARE PERFORMANCE | CPU LOAD | | SAMPLING INTERVAL: 1 s<br>DATA TRANSMISSION INTERVAL: 1 s<br>ACQUISITION COMMAND: A | SAMPLING INTERVAL: 500 ms<br>DATA TRANSMISSION INTERVAL: 5 s<br>ACQUISITION COMMAND: B | SAMPLING INTERVAL: 500 ms<br>DATA TRANSMISSION INTERVAL: 5 s<br>ACQUISITION COMMAND: B | SAMPLING INTERVAL: 500 ms<br>DATA TRANSMISSION INTERVAL: 1 s<br>ACQUISITION COMMAND: B |
| | MEMORY USAGE RATE | | | | | |
| | ... | | ... | ... | ... | ... |
| SOFTWARE PERFORMANCE | INTERNAL PROCESSING TIME | | SAMPLING INTERVAL: 1 s<br>DATA TRANSMISSION INTERVAL: 1 s<br>ACQUISITION COMMAND: C | SAMPLING INTERVAL: 500 ms<br>DATA TRANSMISSION INTERVAL: 5 s<br>ACQUISITION COMMAND: D | SAMPLING INTERVAL: 500 ms<br>DATA TRANSMISSION INTERVAL: 5 s<br>ACQUISITION COMMAND: D | SAMPLING INTERVAL: 500 ms<br>DATA TRANSMISSION INTERVAL: 1 s<br>ACQUISITION COMMAND: D |
| | ... | | ... | ... | ... | ... |
| COMMUNICATION PERFORMANCE | RSSI | | SAMPLING INTERVAL: 1 s<br>SAMPLING COMMAND: X<br>DATA TRANSMISSION INTERVAL: 1 s<br>ACQUISITION COMMAND: E | SAMPLING INTERVAL: 100 ms<br>SAMPLING COMMAND: Y<br>DATA TRANSMISSION INTERVAL: 1 s<br>ACQUISITION COMMAND: E | SAMPLING INTERVAL: 100 ms<br>SAMPLING COMMAND: Y<br>DATA TRANSMISSION INTERVAL: 1 s<br>ACQUISITION COMMAND: E | SAMPLING INTERVAL: 100 ms<br>SAMPLING COMMAND: Y<br>DATA TRANSMISSION INTERVAL: 1 s<br>ACQUISITION COMMAND: E |
| | LQ | | | | | |
| | PER/BER | | | | | |
| | RESPONSE TIME | | | | | |
| | NUMBER OF RETRANSMISSIONS | | | | | |
| | ... | | ... | ... | ... | ... |

FIG. 15

(INPUT SCREEN OF FIFTH EMBODIMENT)

| GATEWAY TYPE | |
|---|---|
| COMMUNICATION TYPE | |
| SENSOR NODE TYPE | |

| SAMPLING INTERVAL | |
|---|---|
| DATA TRANSMISSION INTERVAL | |

INFORMATION PROCESSING DEVICE AND INFORMATION PROCESSING METHOD

CROSS-REFERENCE TO RELATED APPLICATION

This application is based upon and claims the benefit of priority of the prior Japanese Patent Application No. 2016-240532, filed on Dec. 12, 2016, the entire contents of which are incorporated herein by reference.

FIELD

A certain aspect of the embodiments is related to an information processing device, an information processing method, and a non-transitory computer-readable storage medium.

BACKGROUND

Recently, with the expansion of Internet of Things (IoT), various devices are connected to information processing devices by various communication methods. Under such circumstances, failures that occur (for example, hardware failures or software failures of the device or communication failures) vary depending on the type of the connected device, the communication method, the radio condition in the surroundings, the use application, or the like. Thus, in IoT environments that change from moment to moment, it is important to monitor the hardware performance, the software performance, the communication performance, and the like of the device and execute failure determination.

In this case, collecting data of various performances frequently to achieve highly accurate failure determination increases the load of hardware or communication. Meanwhile, data of various performances collected at a frequency that does not become the load of hardware or communication may be insufficient for the failure determination.

There has been conventionally known a technique that achieves the leveling of the network loads associated with data collection and the data collection within the transmission time limit based on the communications traffic history as disclosed in, for example, International Publication No. 2015/107574. There has been also known a technique that preliminarily sets the rate according to the processing performance of a CPU or a communication device (limited transmission rate) in a router node and sets the measurement interval and the transmission interval based on the limited transmission rate as disclosed in, for example, Japanese Patent Application Publication No. 2008-42458.

SUMMARY

According to an aspect of the embodiments, there is provided an information processing device including: a memory; and a processor coupled to the memory and configured to: decide an acquisition method of acquiring data using a sensor node; acquire measurement data measured at the sensor node and performance data relating to a performance of the sensor node according to the decided acquisition method; determine a presence or absence of occurrence of an anomaly based on the acquired measurement data and/or the acquired performance data; and divide an appearance range of data values of the performance data into a plurality of level ranges indicating a degree of quality of the data values and store the plurality of level ranges in a storage unit, wherein the processor is configured to decide a level range in which a data value of the acquired performance data is included by referring to the storage unit, and decide the acquisition method based on a combination of the decided level range and the presence or absence of occurrence of the anomaly.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates an exemplary data structure of a performance value DB;

FIG. 6 illustrates an exemplary data structure of a measurement value DB;

FIG. 7A and FIG. 7B are diagrams for describing anomaly determination executed by an anomaly determination unit;

FIG. 10 illustrates an exemplary data structure of an acquisition method table;

FIG. 15 illustrates an input screen of a fifth embodiment;

DESCRIPTION OF EMBODIMENTS

In common environments such as houses and offices, disturbance (such as infiltration of radio waves from outside, shielding, interference, or the like) occurs uncertainly, and the communication volume does not change in the same way every day. Thus, the above conventional techniques are unable to collect data appropriately.

First Embodiment

Hereinafter, a description will be given of a first embodiment of an information processing system with reference to FIG. 1 through FIG. 10.

Figure 1:
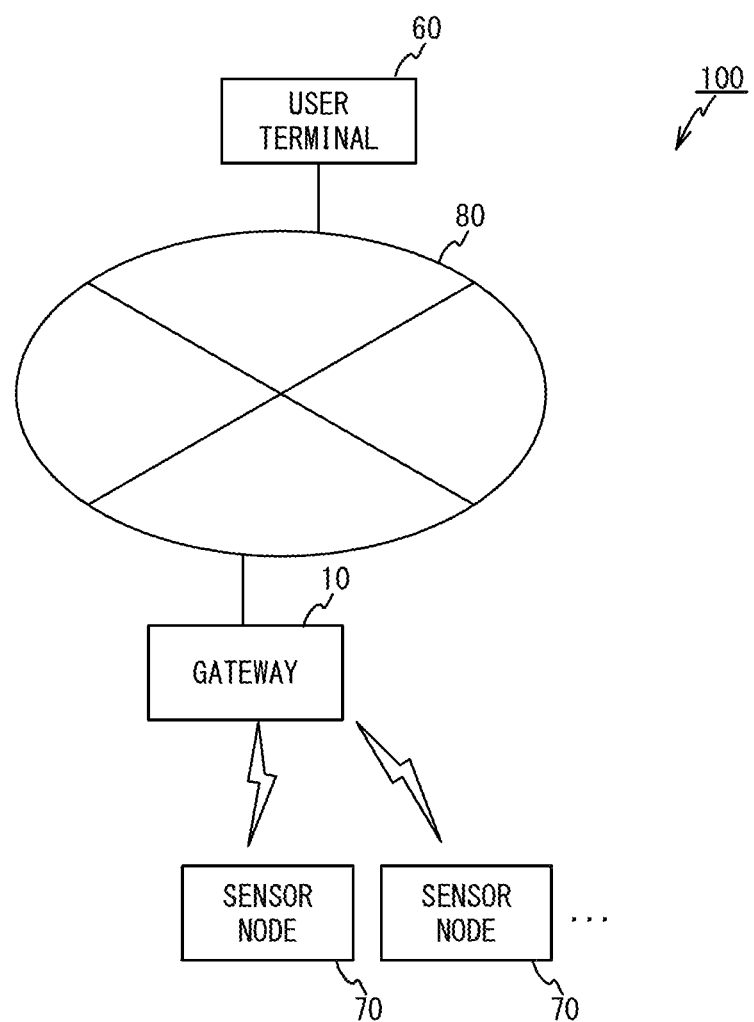
FIG. 1 schematically illustrates a configuration of an information processing system.

FIG. 1 schematically illustrates a configuration of an information processing system 100 in accordance with the first embodiment. The information processing system 100 includes many sensor nodes 70, a gateway 10 as an information processing device, and a user terminal 60. The gateway 10 and the user terminal 60 are coupled to a network 80.

The sensor node 70 includes a sensor and a device in which a data processing function and a wireless communication function are implemented. For example, the sensor node 70 measures temperature, humidity, or water level of sewage and gas concentration in a manhole, and transmits the measurement value to the gateway 10 by wireless communication. Additionally, the sensor node 70 measures performance data (performance values) indicating the performance (the hardware performance, the software performance, the communication performance) of the sensor node 70 itself. The type of each performance (the hardware performance, the software performance, the communication performance) is hereinafter also referred to as a category.

Figure 3:
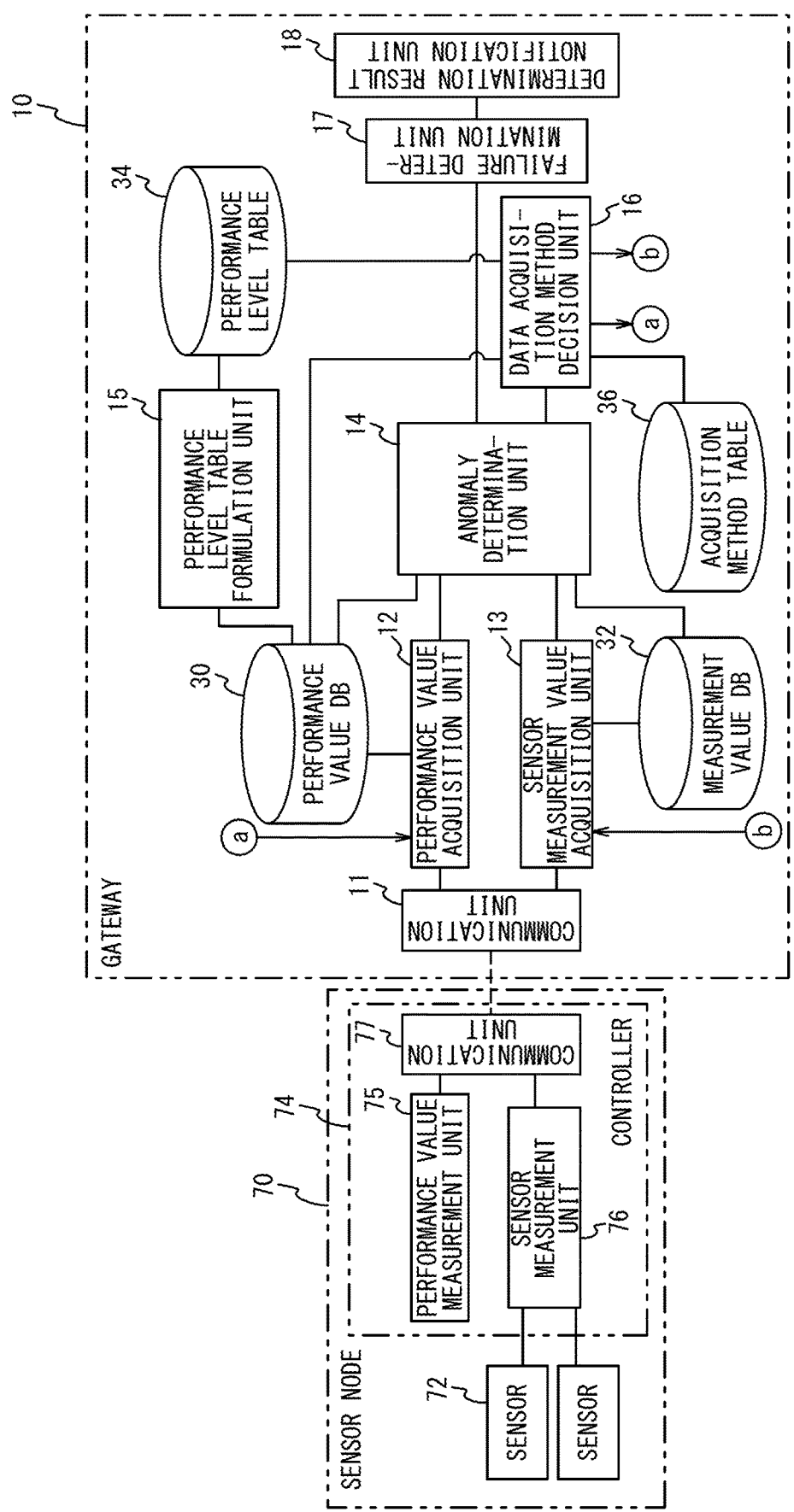
FIG. 3 is a functional block diagram of a sensor node and the gateway.

FIG. 3 is a functional block diagram of the sensor node 70 and the gateway 10. As illustrated in FIG. 3, the sensor node 70 includes one or a plurality of sensors 72 and a controller 74.

The sensors 72 include sensors that measure temperature and humidity and sensors that measure water level and gas concentration.

The functions of a performance value measurement unit 75, a sensor measurement unit 76, and a communication unit 77 are implemented to the controller 74 by execution of programs by a central processing unit (CPU). The performance value measurement unit 75 measures values (performance values) of performance data indicating the performance of the hardware or software of the sensor node 70 based on the sampling interval and the acquisition command notified from the gateway 10 (the performance value acquisition unit 12) through the communication unit 77. Examples of the performance data indicating the performance of hardware or software, i.e., the performance data of which the category is the "hardware performance" or the "software performance" include, but are not limited to, a CPU utilization, a memory usage rate, a hard disk drive (HDD) usage rate, a remaining battery capacity, temperature in the sensor node, and an internal processing time.

Additionally, upon receiving a command (a sampling command) for acquiring values (performance values) of performance data indicating the communication performance from the gateway 10 (the performance value acquisition unit 12), the performance value measurement unit 75 measures the values of the performance data indicating the communication performance. Examples of the performance data indicating communication performance, i.e., the performance data of which the category is the "communication performance" include, but are not limited to, a received signal strength indicator (RSSI), link quality (LQ), a packet error rate (PER), a bit error rate (BER), response time, the number of retransmissions, a channel utilization, and the number of active nodes.

When the sampling interval and the acquisition command are notified from the gateway 10 (the sensor measurement value acquisition unit 13), the sensor measurement unit 76 acquires a measurement value (a sensor measurement value) measured by the sensor 72 at the notified sampling interval.

The performance value measurement unit 75 and the sensor measurement unit 76 transmit unsent data all together through the communication unit 77 at data transmission intervals notified from the performance value acquisition unit 12 or the sensor measurement value acquisition unit 13. The performance value measurement unit 75 and the sensor measurement unit 76 may transmit unsent data all together to the gateway 10 through the communication unit 77 when receiving a data request command from the performance value acquisition unit 12 or the sensor measurement value acquisition unit 13.

The gateway 10 is a device installed in, for example, a utility pole or the like. The gateway 10 receives the performance values and the sensor measurement values measured at the sensor nodes 70, and decides a method of acquiring the performance value and the sensor measurement value using the sensor node (hereinafter, referred to as a "data acquisition method") based on the received values. In addition, the gateway 10 determines the presence or absence of an anomaly (failure) based on the sensor measurement value, and notifies the user terminal 60 of information about the anomaly (failure) through the network 80.

Figure 2A:
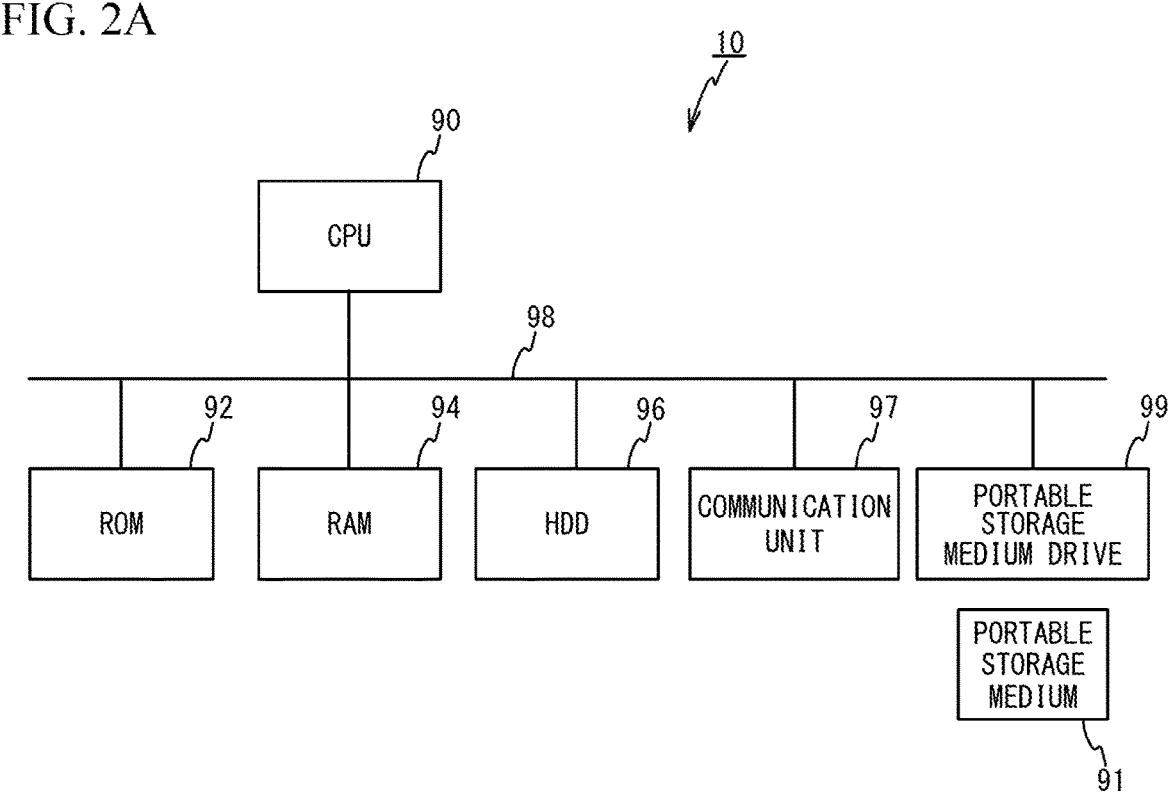
FIG. 2A illustrates a hardware configuration of a gateway.

FIG. 2A illustrates a hardware configuration of the gateway 10. As illustrated in FIG. 2A, the gateway 10 includes a CPU 90, a read only memory (ROM) 92, a random access memory (RAM) 94, a storage unit (here, an HDD) 96, a communication unit 97, and a portable storage medium drive 99. The communication unit 97 has a function to wirelessly communicate with the communication unit 77 of the sensor node 70 and a function to communicate with the user terminal 60 through the network 80. The components of the gateway 10 are coupled to a bus 98. In the gateway 10, the functions of each unit illustrated in FIG. 3 are implemented by the execution of programs (including an information processing program) stored in the ROM 92 or the HDD 96 or programs (including the information processing program) read from the portable storage medium 91 by the portable storage medium drive 99 by the CPU 90. The details of each unit in FIG. 3 will be described later.

Figure 2B:
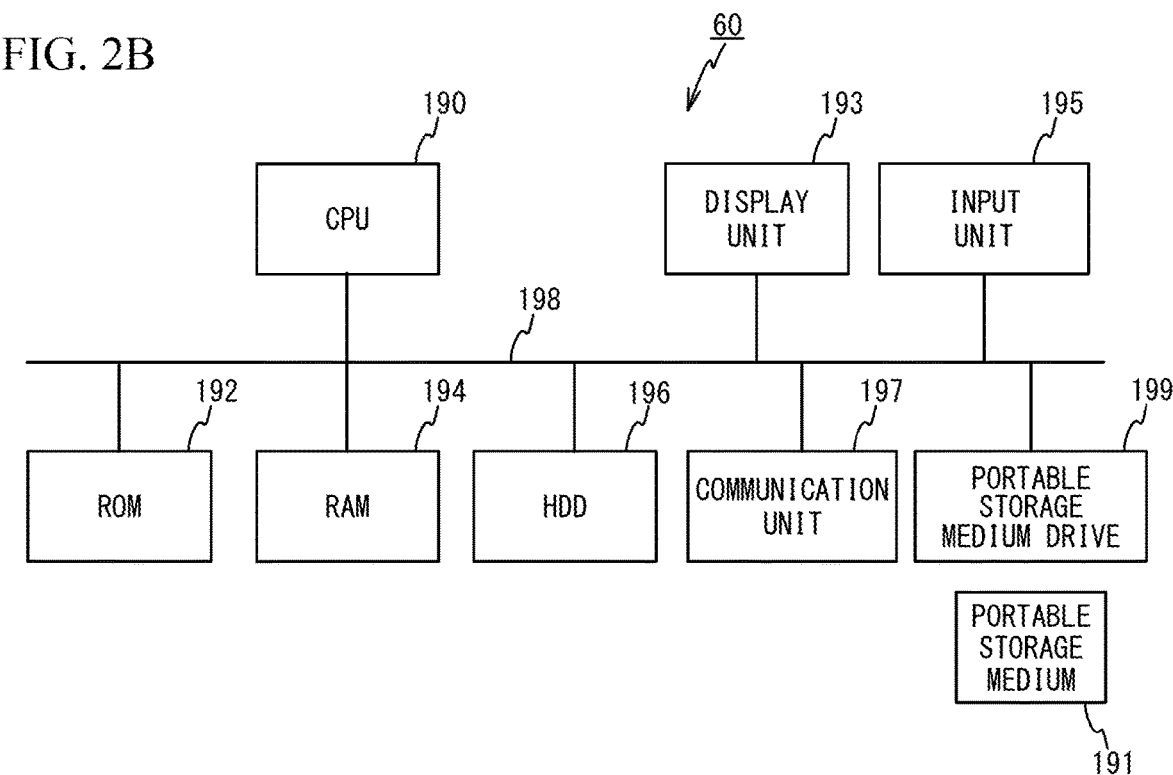
FIG. 2B illustrates a hardware configuration of a user terminal.

The user terminal 60 receives information about an anomaly (failure) from the gateway 10 and informs a user of the received information. FIG. 2B illustrates a hardware configuration of the user terminal 60. The user terminal 60 includes, as illustrated in FIG. 2B, a CPU 190, a ROM 192, a RAM 194, a storage unit (an HDD) 196, a communication unit 197, a display unit 193, an input unit 195, and a portable storage medium drive 199 capable of reading a portable storage medium 191 as with the gateway 10. The components of the user terminal 60 are coupled to a bus 198. The display unit 193 includes a liquid crystal display or the like, and the input unit 195 includes a keyboard, a mouse, a touch panel, or the like.

The function of the gateway 10 will be described based on FIG. 3. As illustrated in FIG. 3, the execution of the programs by the CPU 90 causes the gateway 10 to function as a communication unit 11, a performance value acquisition unit 12, a sensor measurement value acquisition unit 13, an anomaly determination unit 14, a performance level table formulation unit 15 as a dividing unit, a data acquisition method decision unit 16, a failure determination unit 17, and a determination result notification unit 18. A performance value DB 30, a measurement value DB 32, a performance level table 34, and an acquisition method table 36 illustrated in FIG. 3 are stored in the HDD 96 or the like.

The communication unit 11 wirelessly communicates with the communication unit 77 of the sensor node 70.

The performance value acquisition unit 12 notifies the sensor node 70 (the performance value measurement unit 75) of the data acquisition method (an acquisition command, a sampling interval, a data transmission interval) notified from the data acquisition method decision unit 16 described later through the communication unit 11. In this case, the sensor node 70 transmits a plurality of sets of performance data indicating the communication performance between the gateway 10 and the sensor node 70 and a plurality of sets of performance data indicating the performance of the hardware or software of the sensor node 70 to the performance value acquisition unit 12. The performance value acquisition unit 12 acquires data of various performances transmitted from the sensor node 70 and stores the data in the performance value DB 30. Additionally, when having updated the performance value DB 30, the performance value acquisition unit 12 notifies the anomaly determination unit 14 of the update of the performance value DB 30.

When there is a wireless communication repeater such as an access point or a router between the gateway 10 and the sensor node 70, the performance value acquisition unit 12 may receive from the repeater a plurality of sets of performance data indicating the communication performance observed by the repeater or a plurality of sets of performance data indicating the performance of the hardware or software of the repeater, and store the data in the performance value DB 30. Alternatively, the performance value acquisition unit 12 may acquire a plurality of sets of performance data indicating the performance of the hardware or software of the gateway 10 itself.

The performance value DB 30 has a data structure illustrated in FIG. 4. More specifically, the performance value DB 30 has a "node ID" field, a "time stamp" field, and fields that store values of each set of performance data (e.g., fields for "RSSI", "LQ", and so on). The performance value DB 30 stores the performance values (e.g., the values of the RSSI and the LQ) acquired at each sensor node 70 together with the node ID, which is the identification information of the sensor node 70, and the time stamp indicating the acquisition date and time of the performance values.

It is assumed that when the performance value acquisition unit 12 is configured to request, at the data transmission interval notified from the data acquisition method decision unit 16, the sensor node 70 to transmit the performance data, the performance value acquisition unit 12 does not notify the sensor node 70 of the data transmission interval. It is assumed that when the sensor node 70 is configured to transmit the performance value to the performance value acquisition unit 12 only when the performance value changes, the performance value acquisition unit 12 does not notify the sensor node 70 of the data transmission interval.
Process Executed by the Performance Value Acquisition Unit 12

Here, a detailed description will be given of a process executed by the performance value acquisition unit 12 along the flowchart of FIG. 5A. The process of FIG. 5A is started when the data acquisition method is transmitted from the data acquisition method decision unit 16.

Figure 5A:
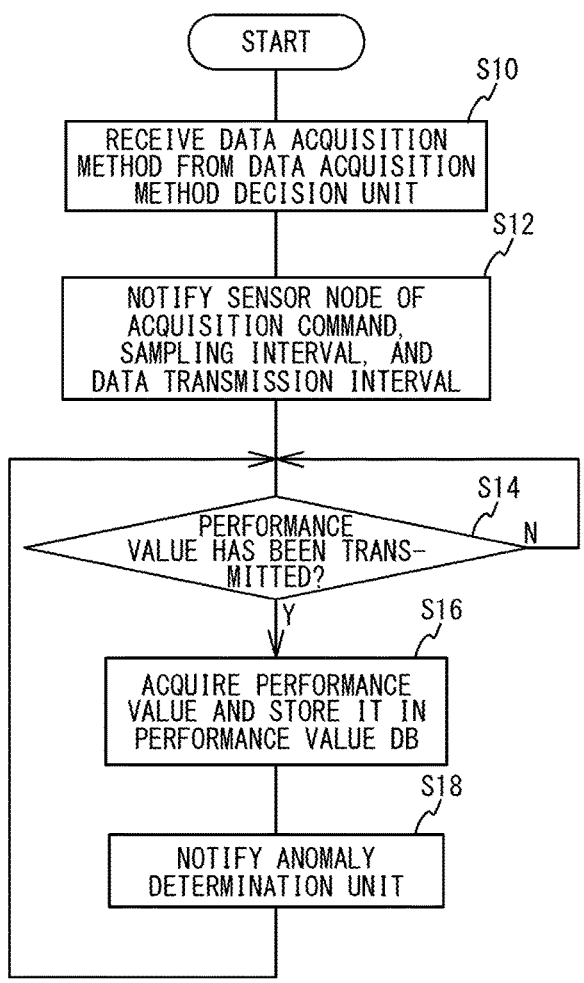
FIG. 5A is a flowchart of a process executed by a performance value acquisition unit in accordance with the first embodiment.

In the process of FIG. 5A, at step S10, the performance value acquisition unit 12 receives, from the data acquisition method decision unit 16, the data acquisition method (the acquisition command, the sampling interval, the data transmission interval). Then, at step S12, the performance value acquisition unit 12 notifies the sensor node 70 of the acquisition command, the sampling interval, and the data transmission interval through the communication unit 11. At the sensor node 70, the performance value measurement unit 75 acquires the performance value based on the acquisition command and the sampling interval, and transmits the acquired performance value to the gateway 10 through the communication unit 77.

Then, at step S14, the performance value acquisition unit 12 waits until the performance value is transmitted from the sensor node 70. When the performance value has been transmitted, the performance value acquisition unit 12 moves to step S16, acquires the transmitted performance value, and stores the acquired performance value in the performance value DB 30.

Then, at step S18, the performance value acquisition unit 12 notifies the anomaly determination unit 14 of the storing of the performance value in the performance value DB 30. Thereafter, the processes of steps S14 through S18 are repeated, but when a new data acquisition method is transmitted from the data acquisition method decision unit 16, the performance value acquisition unit 12 once ends the process of FIG. 5A, and executes the process of FIG. 5A from the start again.

Some performance data indicating the communication performance includes data that is unable to be acquired unless some kind of communication packet is transmitted or received. Thus, the data acquisition method received by the performance value acquisition unit 12 from the data acquisition method decision unit 16 may include a command (a sampling command) for sampling the performance data indicating the communication performance. When acquiring the sampling command, the performance value acquisition unit 12 transmits the sampling command to the sensor node 70 based on the sampling interval separately from the process of FIG. 5A. This configuration enables to acquire all sets of the performance data indicating the communication performance at the sampling interval decided by the data acquisition method decision unit 16.

Referring back to FIG. 3, the sensor measurement value acquisition unit 13 notifies the sensor node 70 (the sensor measurement unit 76) of the acquisition command, the sampling interval, and the data transmission interval notified from the data acquisition method decision unit 16, and receives data (sensor measurement values) measured by the sensor 72 from the sensor node 70. Additionally, the sensor measurement value acquisition unit 13 stores the received sensor measurement values in the measurement value DB 32 and notifies the anomaly determination unit 14 of the update of the measurement value DB 32.

FIG. 6 illustrates an exemplary data structure of the measurement value DB 32. As illustrated in FIG. 6, the measurement value DB 32 has a "node ID" field, a "time stamp" field, and fields that store various sensor measurement values (a "temperature" field, a "humidity" field, and so on). The measurement value DB 32 stores sensor measurement values (for example, temperature, humidity, water level, gas concentration, and the like) acquired at each sensor node 70 together with the node ID, which is the identification information of the sensor node 70, and the time stamp indicating the acquisition date and time of the sensor measurement value.

It is assumed that when the sensor measurement value acquisition unit 13 is configured to request, at the data transmission interval notified from the data acquisition method decision unit 16, the sensor node 70 to transmit the sensor measurement value, the sensor measurement value acquisition unit 13 does not notify the sensor node 70 of the data transmission interval. It is also assumed that when the sensor node 70 is configured to transmit the sensor measurement value to the sensor measurement value acquisition unit 13 only when the sensor measurement value has changed, the sensor measurement value acquisition unit 13 does not notify the sensor node 70 of the data transmission interval.

Process Executed by the Sensor Measurement Value Acquisition Unit 13

Here, the process executed by the sensor measurement value acquisition unit 13 will be described in detail along the flowchart of FIG. 5B.

Figure 5B:
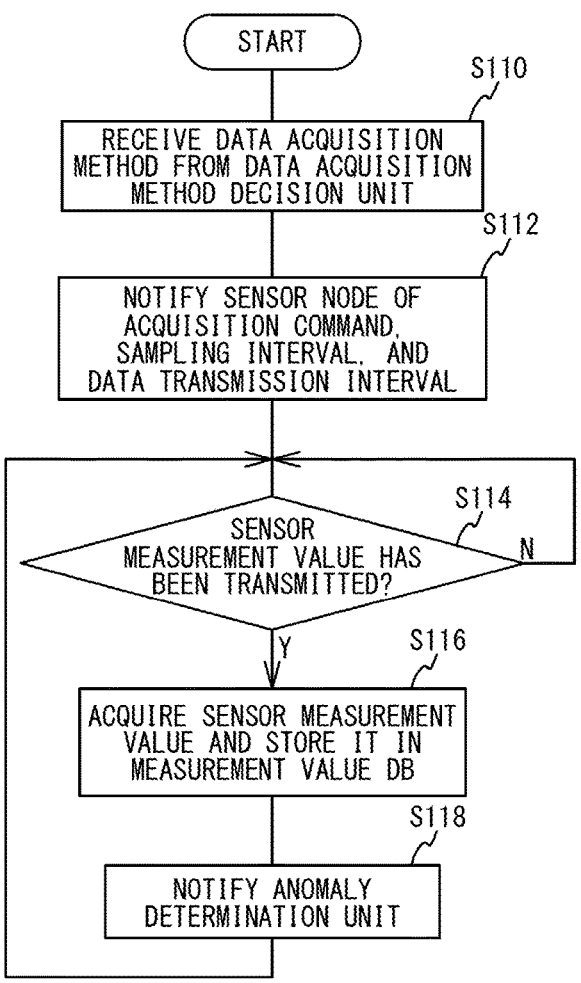
FIG. 5B is a flowchart of a process executed by a sensor measurement value acquisition unit in accordance with the first embodiment.

In the process of FIG. 5B, at step S110, the sensor measurement value acquisition unit 13 receives from the data acquisition method decision unit 16 the data acquisition method (the acquisition command, the sampling interval, the data transmission interval). Then, at step S112, the sensor measurement value acquisition unit 13 notifies the sensor node 70 of the acquisition command, the sampling interval, and the data transmission interval through the communication unit 11. In the sensor node 70, the sensor measurement unit 76 acquires the sensor measurement value with use of the sensor 72 based on the acquisition command and the sampling interval, and then transmits the acquired sensor measurement value to the gateway 10 through the communication unit 77.

Then, at step S114, the sensor measurement value acquisition unit 13 waits until the sensor measurement value is transmitted from the sensor node 70. When the sensor measurement value has been transmitted, the sensor measurement value acquisition unit 13 moves to step S116, acquires the transmitted sensor measurement value, and stores it in the measurement value DB 32.

Then, at step S118, the sensor measurement value acquisition unit 13 notifies the anomaly determination unit 14 of the storing of the sensor measurement value in the measurement value DB 32. Thereafter, the processes of steps S114 through S118 are repeated, but when a new data acquisition method is transmitted from the data acquisition method decision unit 16, the sensor measurement value acquisition unit 13 once ends the process of FIG. 5B, and executes the process of FIG. 5B from the start again.

Referring back to FIG. 3, when receiving the notification of the update of the measurement value DB 32 from the sensor measurement value acquisition unit 13, or when receiving the notification of the update of the performance value DB 30 from the performance value acquisition unit 12, the anomaly determination unit 14 acquires the most recent data from the measurement value DB 32 or the performance value DB 30, and determines the presence or absence of an anomaly. Then, the anomaly determination unit 14 notifies the data acquisition method decision unit 16 of the determined presence or absence of an anomaly. Additionally, when detecting the occurrence of an anomaly, the anomaly determination unit 14 notifies the failure determination unit 17 of the source data (the node ID, the time stamp, the data name, and the data value) from which the anomaly determination unit 14 has determined the occurrence of an anomaly.

Here, the anomaly determination unit 14 may determine that an anomaly occurs when the anomaly determination unit 14 has failed to acquire the sensor measurement value or the performance value as indicated by the bold line frame in FIG. 7A. Alternatively, the anomaly determination unit 14 may determine that an anomaly occurs when the result of comparison between the performance value and a threshold value indicates an anomaly as indicated by the bold line frame in FIG. 7B. Alternatively, the anomaly determination unit 14 may determine the presence or absence of an anomaly based on whether the anomaly determination unit 14 has received an error message. Alternatively, the anomaly determination unit 14 may acquire a plurality of pieces of most recent data from the measurement value DB 32 or the performance value DB 30 and then determine the presence or absence of an anomaly based on whether the feature quantity, such as the average or the variance value, of the acquired plurality of pieces of data is greater than a threshold value.

The performance level table formulation unit 15 acquires various performance values from the performance value DB 30, and divides the range within which the values of each performance vary (the appearance range) into two or more level ranges (for example, two level ranges of "good" and "bad", or three level ranges of "good", "normal", and "bad"), and updates the performance level table 34 as a storage unit by the threshold value used for the division. The performance level table 34 has a data structure illustrated in FIG. 8A. The performance level table 34 is basically formulated with respect to each sensor node 70, but for example, when the same type of the sensor nodes 70 using the same communication method exist in the same location, one performance level table 34 may be formulated for these sensor nodes 70. Alternatively, for example, the wireless communication state changes depending on weekdays and holidays and daytime and night-time. Thus, the performance level table 34 may be formulated with respect to each day of the week or each hour. Alternatively, the performance level table 34 in which the performance level is set with respect to each of all the collectable performance data may be formulated, or the performance level table 34 in which the performance level is limitedly set with respect to each set of the performance data necessary for adjusting the acquisition command, the sampling interval, and the data transmission interval may be formulated.

Figures 8A, 8B:
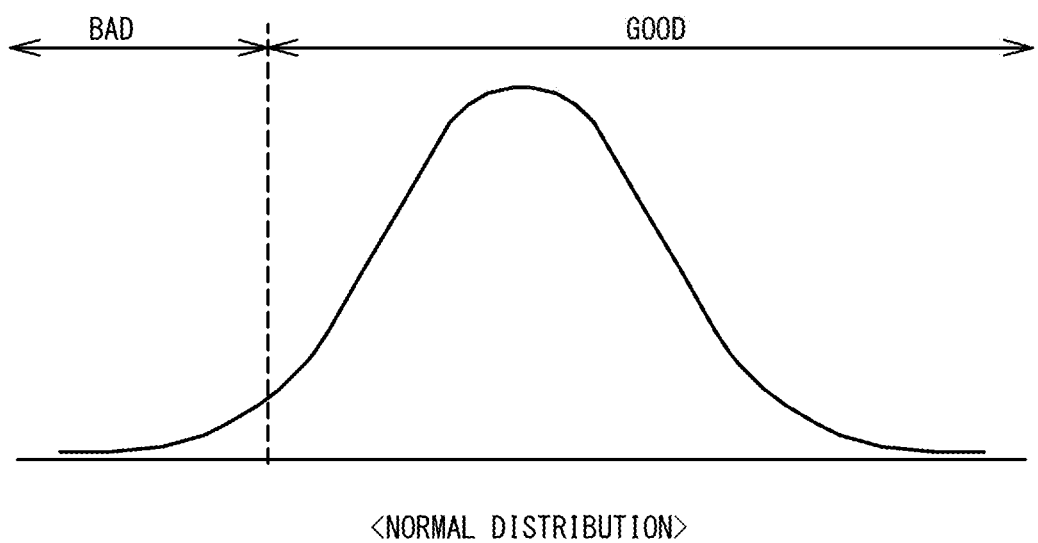
FIG. 8A illustrates an exemplary data structure of a performance level table.
FIG. 8B illustrates a normal distribution of performance values.

The performance level table formulation unit 15 is able to define the level ranges "good", "bad", and "normal" based on the average or the mode of the performance values. Alternatively, the performance level table formulation unit 15 may define the level ranges "good", "bad", and "normal" from the normal distribution of the performance values. For example, as illustrated in FIG. 8B, the lower 10% range of the normal distribution may be defined as "bad" and the other range may be defined as "good". The central 80% range may be defined as "normal" and the ranges at both sides of "normal" may be defined as "good" and "bad".

The process of updating the performance level table 34 by the performance level table formulation unit 15 may be performed every time a new performance value is registered in the performance value DB 30, or at regular time intervals (for example, every one hour). Alternatively, the performance level table formulation unit 15 may update the performance level table 34 when the presence of an anomaly has been determined by the anomaly determination unit 14.

Process Executed by the Performance Level Table Formulation Unit 15

Figure 9:
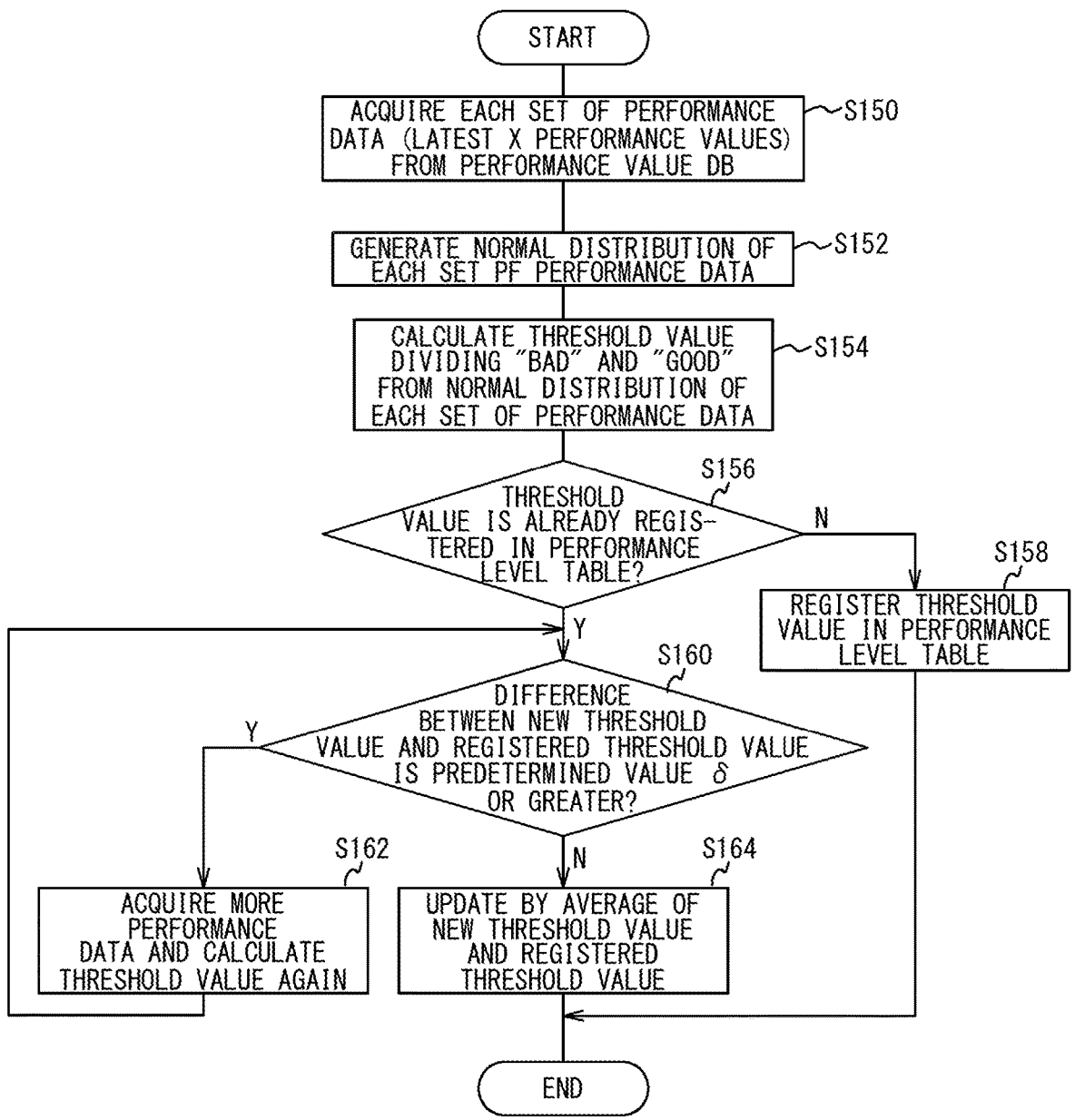
FIG. 9 is a flowchart of a process executed by a performance level table formulation unit in accordance with the first embodiment.

Here, the process executed by the performance level table formulation unit 15 will be described in detail along the flowchart of FIG. 9. The process of FIG. 9 is executed when the update process previously described is executed. In the description for FIG. 9, described as an example is a case where the appearance range of each set of performance data (performance values) is divided into two level ranges: a "good" level and a "bad" level.

In the process of FIG. 9, at step S150, the performance level table formulation unit 15 acquires each set of performance data (most recent X performance values) from the performance value DB 30. Then, at step S152, the performance level table formulation unit 15 generates the normal distribution of each set of the performance data (see FIG. 8B).

Then, at step S154, the performance level table formulation unit 15 calculates a threshold value that divides the appearance range of each set of the performance data into the "bad" level and the "good" level from the normal distribution of each set of performance data. Then, at step S156, the performance level table formulation unit 15 determines whether the calculated threshold value is already registered in the performance level table 34 (that is, whether the field for storing the calculated threshold value is blank or not). When the determination at step S156 is NO, the process moves to step S158, and the performance level table formulation unit 15 registers the threshold value calculated at step S154 in the performance level table 34. Thereafter, the entire process of FIG. 9 is ended.

On the other hand, when the determination at step S156 is YES, the process moves to step S160, and the performance level table formulation unit 15 determines whether the difference between the newly calculated threshold value and the registered threshold value is equal to or greater than a predetermined value (6). When the determination at step S160 is YES, i.e., when the difference between the newly calculated threshold value and the registered threshold value is enormously large, it is considered that the reliability of the newly calculated threshold value is low. Thus the process moves to step S162, and the performance level table formulation unit 15 acquires more performance data, and calculates the threshold value again. Thereafter, the process returns to step S160.

On the other hand, when the determination at step S160 is NO, the process moves to step S164, and the performance level table formulation unit 15 updates the threshold value of the performance level table 34 by the average value of the newly calculated threshold value and the registered threshold value. Thereafter, the entire process of FIG. 9 is ended.

The performance level table formulation unit 15 is capable of appropriately updating the threshold value in the performance level table 34 by executing the above processes.

Referring back to FIG. 3, the data acquisition method decision unit 16 acquires the presence or absence of an anomaly received from the anomaly determination unit 14 and the most recent performance data (the most recent performance values) acquired from the performance value DB 30, refers to the performance level table 34 and the acquisition method table 36, and decides the data acquisition method according to the presence of absence of an anomaly and the performance data (the performance values). Here, the acquisition method table 36 has a data structure illustrated in FIG. 10. Each item in the "performance value" of the acquisition method table 36 corresponds to the corresponding item in the "performance value" of the performance level table 34.

As illustrated in FIG. 10, the acquisition command, the sampling interval, and the data transmission interval are preliminarily registered in the acquisition method table 36 with respect to each of the combinations of the "presence" or "absence" of an anomaly and "good" or "bad" of the performance level. Hereinafter, the acquisition method table 36 will be described in detail.

(1) Case where an anomaly is "absent" and the performance level is "good"

The acquisition command to acquire the performance data is a command (an acquisition command A, C, or E) allowing detailed information to be acquired although the packet size is large. The sampling interval is configured to be slightly longer to the extent that the determination of the declining trend is possible (for example, the sampling interval: 1 s). The data transmission interval is configured to be a frequent interval to the extent that the communication load is not increased so much (for example, the data transmission interval: 1 s).

(2) Case where an anomaly is "absent" and the performance level is "bad"

A command (an acquisition command B, D, or E) allowing for the acquisition of information enough to determine whether a failure is present or absent although the accuracy of the information is less is set as the acquisition command for acquiring the performance data, thereby reducing the packet size and the communication load. The sampling interval is configured to be shorter than the sampling interval in the case (1) so as to allow for the determination of a failure is possible (e.g., the sampling interval: 500 ms or 100 ms). This configuration increases the loads of the sensor node 70 and the gateway 10. The data transmission interval is made longer to the extent that the communication load is not increased so much and the determination timing does not delay (for example, the data transmission interval: 5 s or 1 s), thereby reducing the communication load.

(3) Case where an anomaly is "present" and the performance level is "good"

In this case, the same configurations as the case (2) are employed.

(4) Case where an anomaly is "present" and the performance level is "bad"

A command allowing for the acquisition of information enough to determine a failure although the accuracy of the information is less (the acquisition command B, D, or E) is set as the acquisition command for acquiring the performance data, thereby reducing the packet size to reduce the communication load. The sampling interval is configured to be shorter to the extent that the determination of a failure is possible (for example, the sampling interval: 500 ms or 100 ms). This configuration increases the loads of the sensor node 70 and the gateway 10. The data transmission interval is configured to be shorter to the extent that a failure is immediately determined (for example, the data transmission interval: 1 s). This configuration increases the communication load.

As described previously, some communication performance data includes data that is unable to be acquired unless some kind of communication packet is transmitted or received. Thus, the acquisition method table 36 of FIG. 10 also stores the sampling command. A command (a sampling command X) allowing detailed information to be acquired although the packet size is large is set as the sampling command in the case (1) while a command (a sampling command Y) allowing for the acquisition of information enough to determine a failure although the accuracy of the information is less is set in the cases (2) through (4).

Here, in the acquisition method table 36 of FIG. 10, a plurality of sets of performance data of which the category is the "hardware performance" may be acquired by a single command. Accordingly, for example, when at least one "bad" level exists as in the case where the performance level of the CPU load is "bad" and other performance levels such as the memory usage rate and the like are "good", it may be determined that the hardware performance level is "bad".

Alternatively, the average of the performance levels is calculated, and the calculated average may be used as the performance level.

Referring back to FIG. 3, when receiving the notification of the occurrence of an anomaly from the anomaly determination unit 14, the failure determination unit 17 acquires from the performance value DB 30 the latest one or more pieces (X pieces) of data (data of which the time stamp is close to the time of the anomaly determination) measured at the sensor node 70 where the anomaly has occurred. The failure determination unit 17 analyzes the acquired data, identifies the contents of the failure (the node ID of the sensor node 70 where the failure has occurred, the date and time of occurrence of the failure, and the contents of the failure), and notifies the determination result notification unit 18 of the identified contents of the failure.

Here, when the latest X pieces of data are acquired, X pieces of data immediately before the time stamp of the data from which the occurrence of an anomaly was determined may be acquired, or X pieces of data before and after the time stamp of the data from which the occurrence of an anomaly was determined may be acquired.

Alternatively, the number X may be changed based on the change cycle of data or the changing amount of data. For example, when the performance data indicates the communication performance, the performance data greatly varies at random, and thus the number X is configured to be a large number (e.g., X=50). When the performance data indicates the performance of hardware or software, the performance data often changes linearly, and thus, the number X may be configured to be a small number (e.g., X=10).

The failure determination unit 17 may employ, as the determination method, comparison of the feature quantity such as the average, the median, or the variance value, comparison between the feature quantity and the threshold value, a cluster analysis, a trend analysis, a learning pattern during normal time, or comparison with a cluster.

The determination result notification unit 18 notifies the user terminal 60 of the contents of the failure (the node ID, the date and time of occurrence of the failure, the contents of the failure) received from the failure determination unit 17. The determination result notification unit 18 may notify, not limited to the user terminal 60, a system operation application, a visualization application, or a terminal used by a system administrator of the determination result.

In the first embodiment, based on the performance level table 34 appropriately updated by the performance level table formulation unit 15, the data acquisition method decision unit 16 determines the performance level of the performance value, and the data acquisition method decision unit 16 then decides the data acquisition method based on the determined performance level and the determination result (the presence or absence of an anomaly) by the anomaly determination unit 14. Then, the performance value acquisition unit 12 and the sensor measurement value acquisition unit 13 acquire the performance value and the sensor measurement value based on the determined data acquisition method.

As clear from the above description, in the first embodiment, the performance value acquisition unit 12 and the sensor measurement value acquisition unit 13 implement functions as the data acquisition unit that acquires the performance value and the sensor measurement value according to the data acquisition method. Additionally, in the first embodiment, the failure determination unit 17 and the determination result notification unit 18 implement functions as the output unit that determines a failure and outputs the determination result.

As described in detail above, in the first embodiment, the performance value acquisition unit 12 and the sensor measurement value acquisition unit 13 acquire the sensor measurement value and the performance value measured at the sensor node 70 according to the data acquisition method decided by the data acquisition method decision unit 16, and the anomaly determination unit 14 determines whether an anomaly occurs based on the sensor measurement value and the performance value. The performance level table formulation unit 15 appropriately divides the appearance range of the performance values into multiple level ranges in accordance with whether the performance value is good or bad to formulate the performance level table 34, and the data acquisition method decision unit 16 decides the data acquisition method from the acquisition method table 36 based on the combination of the level range including the most recent performance value and the presence or absence of an anomaly. This configuration allows the first embodiment to optimize the data acquisition method (the acquisition command, the sampling interval, the data transmission interval) in accordance with the most recent performance value and the presence or absence of an anomaly by using the performance level table 34 appropriately formulated based on the actually acquired performance value. Accordingly, the highly accurate detection and determination of performance deterioration or a failure are possible without increasing the loads of hardware and communication so much in IoT environments, which change from moment to moment.

The gateway 10 of the first embodiment is applicable irrespective of the communication method or the communication function between the sensor node 70 and the gateway 10, and therefore is capable of being deployed in various sites.

In the above first embodiment, the functions, DBs, and tables included in the gateway 10 may be included in a server (a cloud) coupled to the network 80.

The above first embodiment describes a case where the anomaly determination unit 14 determines the presence or absence of an anomaly based on the sensor measurement value and the performance value, but does not intend to suggest any limitation. The presence or absence of an anomaly may be determined based on one of the sensor measurement value and the performance value.

Second Embodiment

Hereinafter, a second embodiment will be described with reference to FIG. 11. In the second embodiment, after deciding the data acquisition method (the acquisition command, the sampling interval, the data transmission interval), the data acquisition method decision unit 16 monitors the performance values indicating each performance (hardware performance, software performance, communication performance) acquired after the determined data acquisition method has been applied, and adjusts one of the sampling interval and the data transmission interval if the performance level changes.

Figure 11:
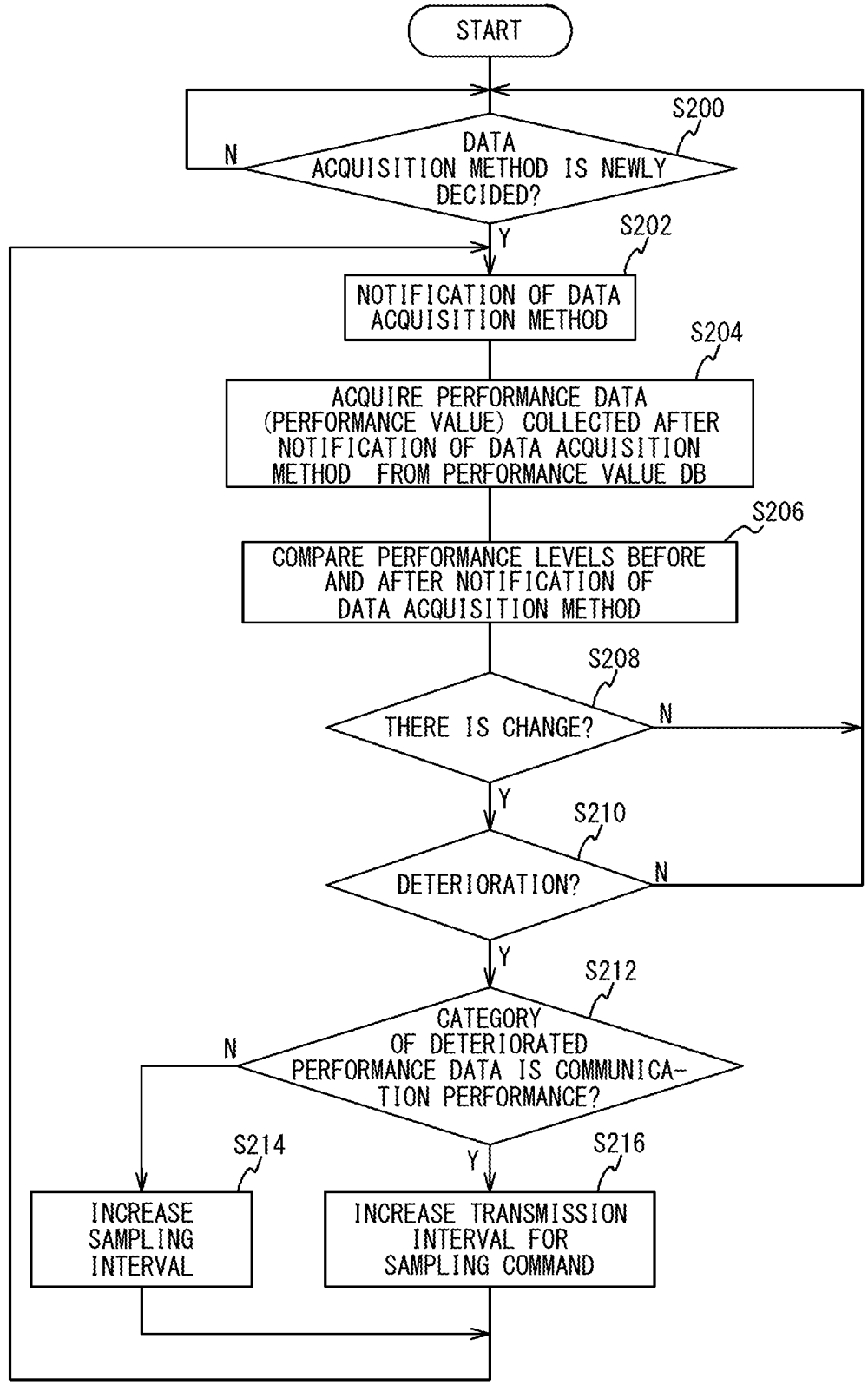
FIG. 11 is a flowchart of a process executed by a data acquisition method decision unit in a second embodiment.

FIG. 11 is a flowchart of the process executed by the data acquisition method decision unit 16 in the second embodiment. In the process of FIG. 11, at step S200, the process waits until the data acquisition method decision unit 16 newly decides the data acquisition method. When the data acquisition method is newly decided, the process moves to step S202, and the data acquisition method decision unit 16 notifies the performance value acquisition unit 12 and the sensor measurement value acquisition unit 13 of the data acquisition method.

Then, at step S204, the data acquisition method decision unit 16 acquires from the performance value DB 30 the performance data (the performance values) acquired by the performance value acquisition unit 12 after the data acquisition method has been notified. Then, at step S206, the data acquisition method decision unit 16 compares the performance level before the notification of the data acquisition method and the performance level after the notification of the data acquisition method.

Then, at step S208, the data acquisition method decision unit 16 determines whether there is a change between the performance levels before and after the notification of the data acquisition method. For example, when the performance level before the notification of the data acquisition method is "good" and the performance level after the notification of the data acquisition method is "bad", it is determined that there is a change. When the determination at step S208 is NO (when there is no change), the data acquisition method decision unit 16 returns to step S200. That is, when the performance level does not change, the data acquisition method (the sampling interval, the data transmission interval) is not changed. On the other hand, when the determination at step S208 is YES (when there is a change), the process moves to step S210.

At step S210, the data acquisition method decision unit 16 determines whether the change is deterioration. When the determination at step S210 is NO (when the change is improvement), the process moves to step S200. That is, when the performance level has become better, the data acquisition method (the sampling interval, the data transmission interval) is not changed. On the other hand, when the determination at step S210 is YES (when the change is deterioration), the process moves to step S212.

At step S212, the data acquisition method decision unit 16 determines whether the category of the deteriorated performance data is a communication performance. When the determination at step S212 is NO, the process moves to step S214, and the data acquisition method decision unit 16 increases the sampling interval. That is, when the hardware performance or the software performance deteriorates, the sampling interval is increased to reduce the loads of the sensor node 70 and the gateway 10. The sampling interval may be increased by a predetermined time (e.g., 10 ms), or may be configured to be the average of the sampling interval before the change and the sampling interval after the change. Thereafter, the process returns to step S202, the data acquisition method after the sampling interval has been increased is notified the performance value acquisition unit 12 and the sensor measurement value acquisition unit 13, and the processes after step S204 are executed.

On the other hand, when the determination at step S212 is YES, the process moves to step S216, and the data acquisition method decision unit 16 increases the transmission interval for the sampling command. That is, when the communication performance deteriorates, the transmission interval for the sampling command is increased to reduce the communication load. Thereafter, the process returns to step S202, and the data acquisition method after the transmission interval of the sampling command has been increased is notified the performance value acquisition unit 12 and the sensor measurement value acquisition unit 13, and the processes after step S204 are executed.

As described above, in the second embodiment, the data acquisition method decision unit 16 adjusts at least one of the elements of the data acquisition method (S214, S216) when the performance level of the performance value after changing the data acquisition method has deteriorated from before the change. This configuration enables to further reduce the loads of hardware and communication according to the IoT environment.

The above second embodiment describes a case where the data acquisition method is not adjusted when the performance level has improved, but does not intend to suggest any limitation. For example, when the performance level has improved, the sampling interval and the transmission interval for the sampling command may be shortened.

Third Embodiment

Hereinafter, a third embodiment will be described with reference to FIG. 12. In the third embodiment, the performance level table formulation unit 15 defines as a "bad" level the range of the performance value when the presence of an anomaly is notified from the anomaly determination unit 14. More specifically, in the third embodiment, instead of the process of FIG. 9 in the first embodiment, the process of FIG. 12 is executed.

Figure 12:
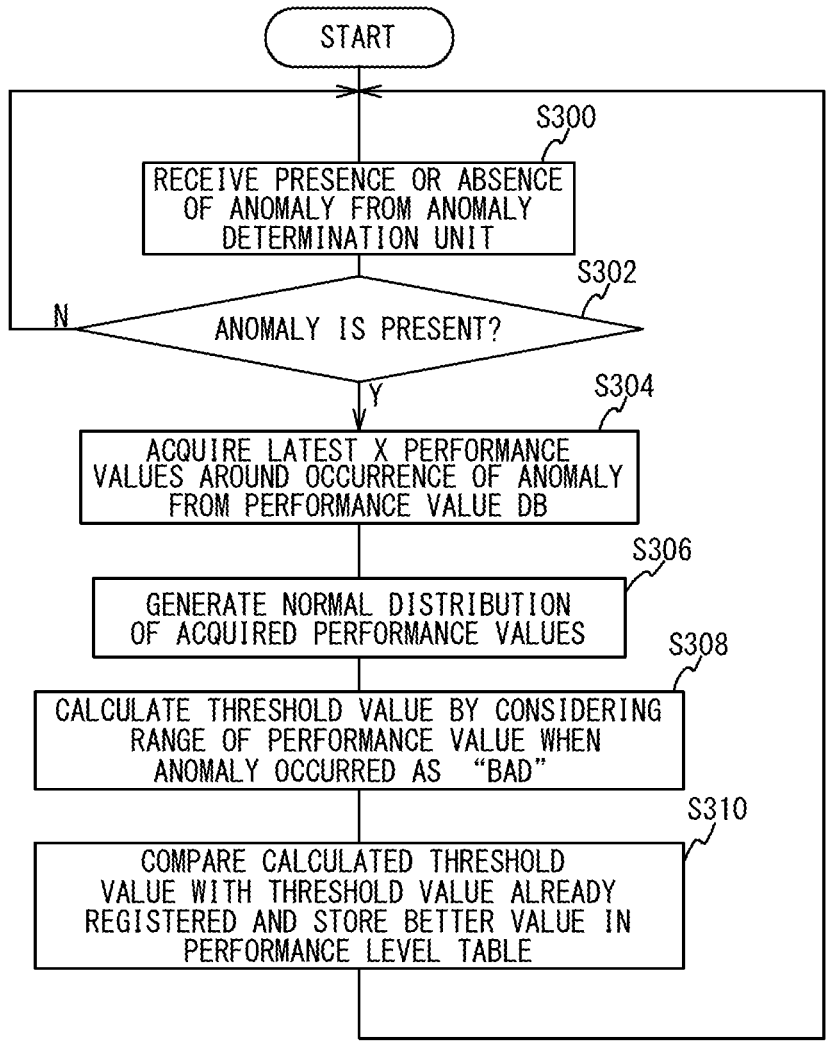
FIG. 12 is a flowchart of a process executed by the performance level table formulation unit in a third embodiment.

In the process of FIG. 12, at step S300, the performance level table formulation unit 15 receives from the anomaly determination unit 14 the presence or absence of an anomaly. Then, at step S302, the performance level table formulation unit 15 determines whether an anomaly is present. When the determination at step S302 is NO, the process returns to step S300 while the process moves to step S304 when the determination at step S302 is YES.

At step S304, the performance level table formulation unit 15 acquires from the performance value DB 30 the latest X (one or more) performance values around the occurrence of an anomaly. In other words, at step S304, the performance level table formulation unit 15 acquires values (performance values) of the performance data acquired by the performance value acquisition unit 12 within a predetermined period of time including the time at which the presence of anomaly was determined. Then, at step S306, the performance level table formulation unit 15 generates the normal distribution of the acquired performance values.

Then, at step S308, the performance level table formulation unit 15 calculates the threshold value by considering the range of the performance value when an anomaly occurred as the "bad" range in the normal distribution. Then, at step S310, the performance level table formulation unit 15 compares the calculated threshold value and the threshold value already registered, and registers the better value in the performance level table 34. As described above, by registering the better value in the performance level table 34, the performance value when an anomaly occurred in the past is also included in the "bad" level. Thereafter, the process returns to step S300.

As described above, in the third embodiment, the performance level table formulation unit 15 formulates the performance level table 34 based on the values (performance values) of the performance data acquired by the performance value acquisition unit 12 within a predetermined period of time including the time at which the presence of an anomaly was determined by the anomaly determination unit 14. Thus, the performance values (X performance values) within the predetermined period of time including the time at which the presence of an anomaly was actually determined is handled as the performance value belonging to the "bad" level, and the threshold value is determined. Therefore, the performance level table 34 is appropriately formulated. Additionally, the data acquisition method decision unit 16 appropriately decides the data acquisition method by using the performance level table 34 formulated in the above described manner.

In the above third embodiment, the maximum value or the minimum value of the performance values acquired at step S304 may be set as the threshold value.

Fourth Embodiment

A description will next be given of a fourth embodiment with reference to FIG. 13 and FIG. 14. In the fourth embodiment, when the ratio of the "bad" level in the normal distribution of the performance values is equal to or greater than a predetermined ratio, the performance level table formulation unit 15 adjusts the range of the "bad" level based on the number of occurrences of an anomaly.

Figure 13:
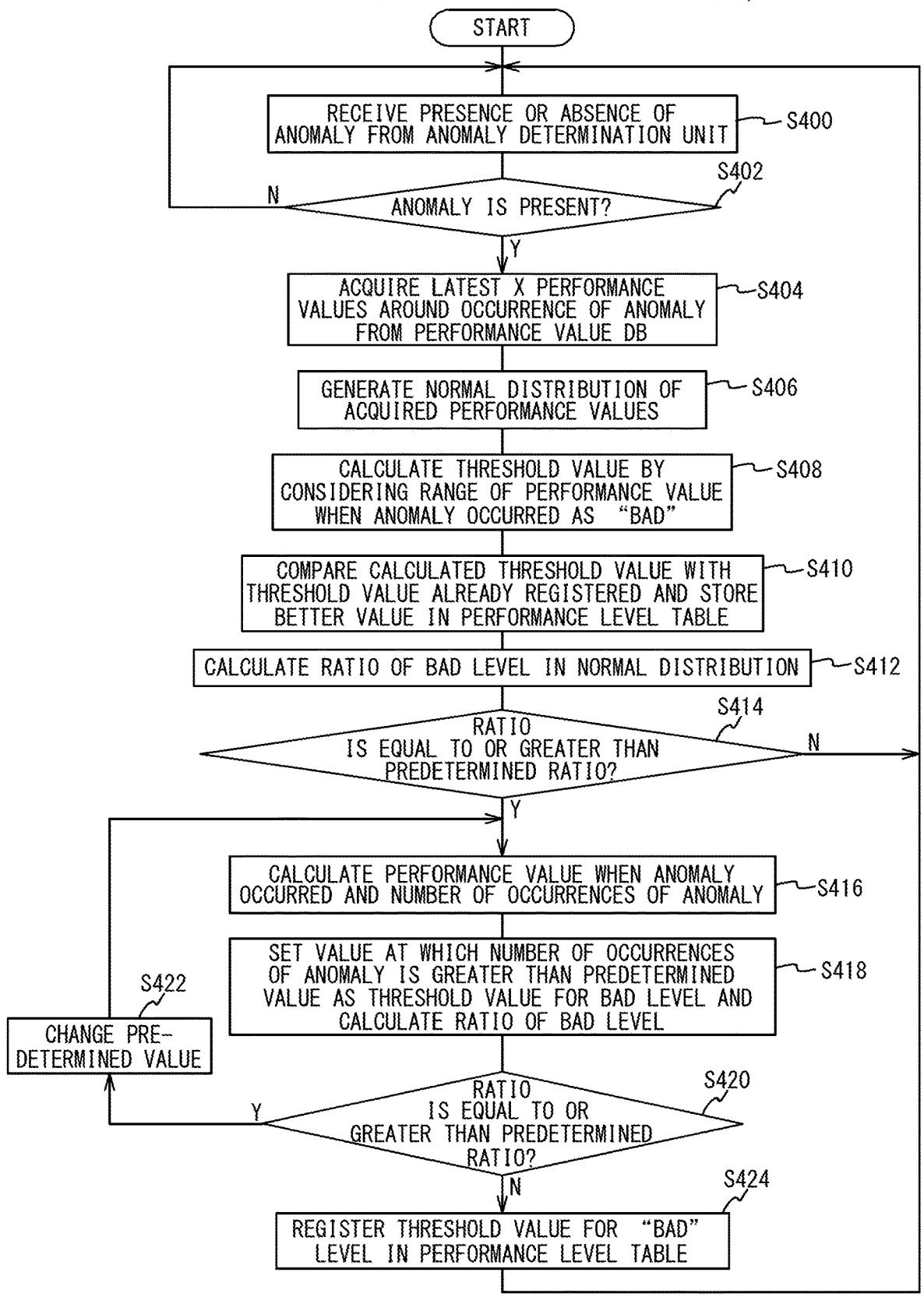
FIG. 13 is a flowchart of a process executed by the performance level table formulation unit in a fourth embodiment.
Figure 14:
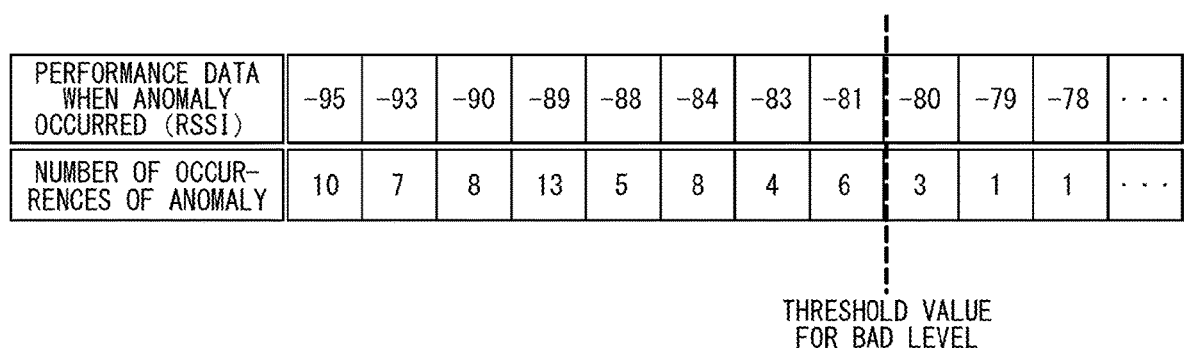
FIG. 14 is a diagram illustrating a relation between the performance value and the number of occurrences of an anomaly.

FIG. 13 is a flowchart of the process executed by the performance level table formulation unit 15 in the fourth embodiment. The processes of steps S400 through S410 are the same as those of steps S300 through 310 in FIG. 12.

When the processes of steps S400 through S410 end and a new threshold value is registered in the performance level table 34, the process moves to step S412, and the performance level table formulation unit 15 calculates the ratio of the "bad" level in the normal distribution.

Then, at step S414, the performance level table formulation unit 15 determines whether the ratio of the "bad" level is equal to or greater than a predetermined ratio (e.g., 15%). When the determination at step S414 is NO (when the ratio is less than the predetermined ratio), the process returns to step S400 with doing nothing. On the other hand, when the determination at step S414 is YES (when the ratio is equal to or greater than the predetermined ratio), the process moves to step S416.

At step S416, the performance level table formulation unit 15 calculates the performance value when an anomaly is present and the number of occurrences of an anomaly. In this case, for example, the relation between the performance values and the number of occurrences of an anomaly illustrated in FIG. 14 is acquired.

Then, at step S418, the performance level table formulation unit 15 sets the value at which the number of occurrences of an anomaly is greater than a predetermined number as a threshold value for the "bad" level, and calculates the ratio of the "bad" level in the normal distribution. For example, the performance level table formulation unit 15 seeks the number of occurrences of an anomaly from the right side (the larger number) in FIG. 14, and sets the value at which the number of occurrences of an anomaly is greater than the predetermined number (assumed to be five) as the threshold value for the "bad" level (see FIG. 14). Then, the ratio of the range in which the performance values are less than the threshold value in the normal distribution is calculated.

Then, at step S420, it is determined whether the ratio of the "bad" level in the normal distribution is equal to or greater than the predetermined ratio (e.g., 15%). When the determination at step S420 is YES, the performance level table formulation unit 15 moves to step S422, changes the predetermined number (for example, increases the predetermined number from 5 to 6), and returns to step S416.

On the other hand, when the determination at step S420 is NO, that is, when the ratio of the "bad" level in the normal distribution is less than the predetermined number (e.g., 15%), the performance level table formulation unit 15 moves to step S424. At step S424, the performance level table formulation unit 15 registers the threshold value for the "bad" level in the performance level table 34. When the process of step S424 ends, the process returns to step S400.

As described above, in the fourth embodiment, in the case where the ratio of the "bad" level in the normal distribution is equal to or greater than the predetermined ratio when the threshold value (the threshold value for the "bad" level) calculated at steps S400 through S410 is used, the "bad" level is set again based on the number of occurrences of an anomaly. This configuration allows the data acquisition method decision unit 16 to decide the data acquisition method based on the performance level table 34 in which an appropriate threshold value is set.

The above fourth embodiment describes a case where the processes of steps S400 through S410 are the same as those of steps S300 through S310 in FIG. 12, but does not intend to suggest any limitation. For example, instead of steps S400 through S410, the process of FIG. 9 (the process of the first embodiment) may be executed.

Fifth Embodiment

A description will next be given of a fifth embodiment with reference to FIG. 15.

In the fifth embodiment, the data acquisition method decision unit 16 receives the sampling interval and the data transmission interval input to an operations management application or the like by the user, and adjusts the data acquisition method (the acquisition command, the sampling interval, the data transmission interval) based on the received intervals.

FIG. 15 illustrates an input screen that the user uses to input in the operations management application. The input screen of FIG. 15 accepts the input of the type of the gateway, the communication type, and the type of the sensor node. Additionally, the input screen accepts the input of the sampling interval and the data transmission interval. The data acquisition method decision unit 16 receives the sampling interval and the data transmission interval input to the input screen of FIG. 15 by the user. Then, the data acquisition method decision unit 16 defines the sampling interval with respect to each performance level by setting the received sampling interval as an upper limit. Additionally, the data acquisition method decision unit 16 defines the data transmission interval with respect to each performance level by setting the received data transmission interval as an upper limit.

Hereinafter, the sampling interval will be described.

(1) Case where an anomaly is "absent" and the performance level is "good"

The received sampling interval, which is the upper limit, is employed because it is sufficient if the determination of the declining trend is possible. However, when the performance values acquired at the received sampling interval are not enough to determine the declining trend, the sampling interval is shortened to the extent that the determination of the declining trend is possible.

(2) Case where an anomaly is "absent" and the performance level is "bad"

The performance values enough to determine a failure are necessary. Thus, the interval shorter than the received sampling interval by a predetermined time (e.g., 100 ms) is employed. However, when the performance values acquired at the received sampling interval are sufficient to determine a failure, the received sampling interval is employed. Alternatively, when the determination of a failure is impossible even when the interval is made shorter than the received sampling interval by a predetermined time, the sampling interval is shortened to the extent that the determination of a failure is possible.

(3) Case where an anomaly is "present" and the performance level is "good"

The same configurations as those in the case (2) are employed.

(4) Case where an anomaly is "present" and the performance level is "bad"

The same configurations as those in the case (2) are employed.

In any of the cases (1) through (4), data of various performances are collected at the received sampling interval, and the sampling interval is adjusted based on whether the determination of the declining trend or the determination of a failure is possible when the presence of anomaly is determined.

The description will next be given of the data transmission interval. (1) Case where an anomaly is "absent" and the performance level is "good"

The data transmission interval is shortened to the extent that the communication load is not increased so much. However, when the communication performance deteriorates because of the transmission at the received data transmission interval, registered is the value that is maintained long to the extent that the communication performance does not deteriorate.

(2) Case where an anomaly is "absent" and the performance level is "bad"

The received data transmission interval is employed as long as the data transmission interval does not increase the communication much and does not delay the determination timing.

(3) Case where an anomaly is "present" and the performance level is "good"

The same configurations as those in the case (2) are employed.

(4) Case where an anomaly is "present" and the performance level is "bad"

Since the data transmission interval needs to be shortened to the extent that the immediate determination of a failure is possible, the interval shorter than the received data transmission interval by a predetermined time (e.g., 100 ms) is employed as the data transmission interval.

In any of the cases (1) through (4), the performance value of the communication performance is monitored after the data transmission interval is changed to the received data transmission interval, and the data transmission interval is adjusted based on whether the performance level deteriorates.

In the fifth embodiment, it is assumed that the user is basically unable to input the acquisition command and the sampling command. However, there is a command that cannot be used depending on the sampling interval (for example, a command of which the response time exceeds the sampling interval). In such a case, the command is changed to a command appropriate to the sampling interval. When there is no command appropriate to the sampling interval, the sampling interval is extended so as to correspond to the response time.

In the above adjustment, when the received sampling interval or the data transmission interval is not employed, the data acquisition method decision unit 16 notifies the user of that the interval is not employed and the reason thereof.

As described above, in the fifth embodiment, the data acquisition method decision unit 16 receives the input of the sampling interval and the data transmission interval that the user desires, and decides the sampling interval and the data transmission interval to be actually used by setting the received sampling interval and the received data transmission interval as upper limits. This configuration enables to decide the appropriate sampling interval and the appropriate data transmission interval taking into consideration the user's request.

The above fifth embodiment may be combined with any of the first through fourth embodiments.

Sixth Embodiment

A description will next be given of a sixth embodiment with reference to FIG. 16. In the sixth embodiment, the data acquisition method decision unit 16 determines whether performance data is data capable of being interpolated, and adjusts the sampling interval when the performance data is the data capable of being interpolated.

Figure 16:
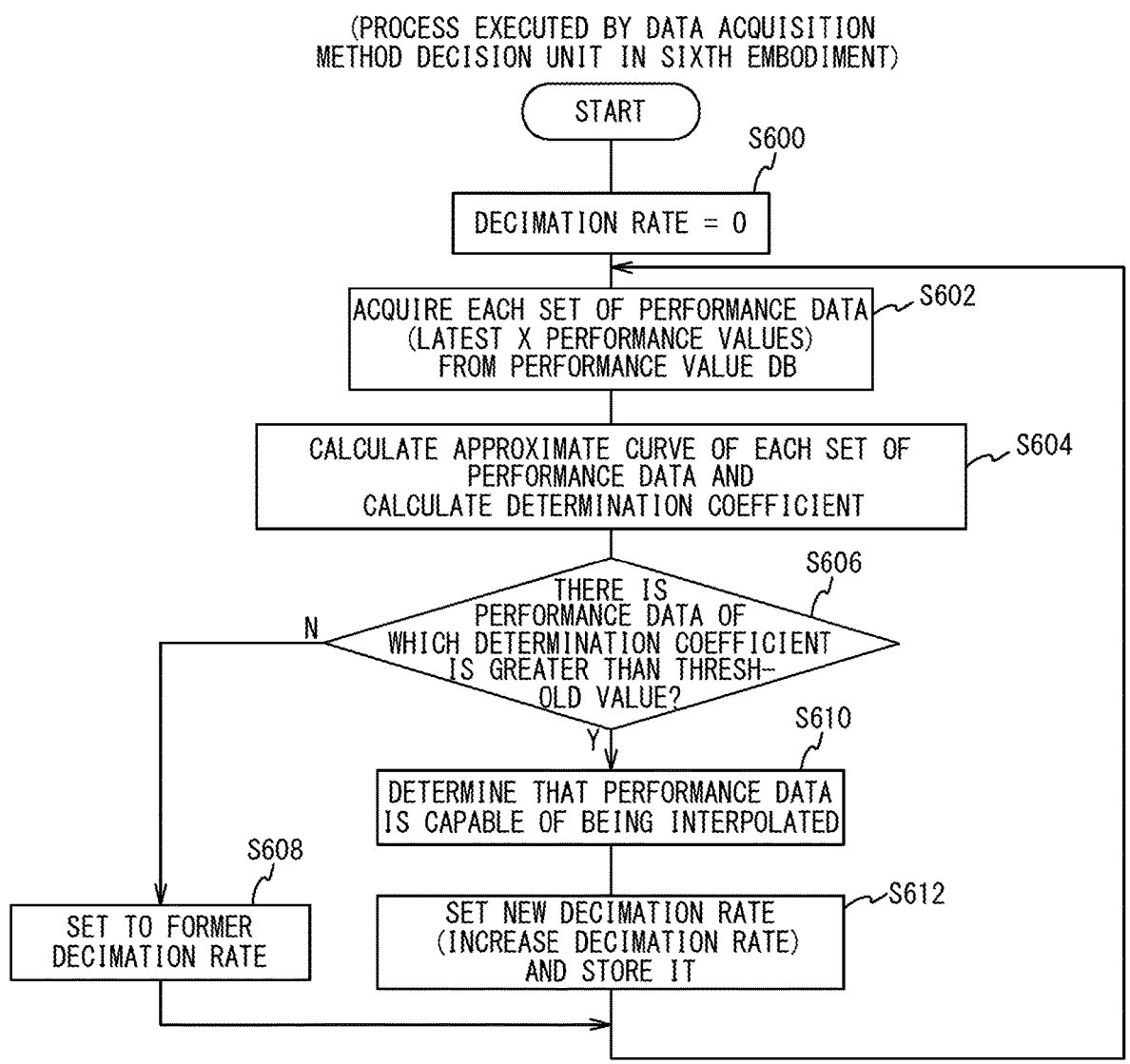
FIG. 16 is a flowchart of a process executed by the data acquisition method decision unit in a sixth embodiment.

FIG. 16 is a flowchart of the process executed by the data acquisition method decision unit 16 in the sixth embodiment. The process of FIG. 16 may be executed every time the performance value is newly registered in the performance value DB 30 or may be executed at predetermined intervals (for example, every one hour).

In the process of FIG. 16, at step S600, the data acquisition method decision unit 16 sets a decimation rate to an initial value (=0). Then, at step S602, the data acquisition method decision unit 16 acquires from the performance value DB 30 each set of performance data (latest X performance values).

Then, at step S604, the data acquisition method decision unit 16 acquires the approximate curve of each set of the performance data (the latest X performance values) to calculate the determination coefficient. Examples of the approximate curve include, but are not limited to, a linear approximate curve, a logarithmic approximate curve, and a polynomial approximate curve. The determination coefficient is a value called an R-square value, which represents the degree of approximation. The determination coefficient ranges from 0 to 1, and the degree of approximation increases as the determination coefficient is closer to 1.

Then, at step S606, the data acquisition method decision unit 16 determines whether there is performance data of which the determination coefficient is greater than the threshold value. The threshold value in this case may be, for example, 0.9. When the determination at step S606 is YES, the process moves to step S610, and the data acquisition method decision unit 16 determines that the performance data is capable of being interpolated. Then, at step S612, the data acquisition method decision unit 16 sets a new decimation rate (increases the decimation rate), and stores it. The decimation rate may be determined as ½->⅓->¼-> . . . every time the process of step S612 is executed, or the new decimation rate may be set through other method. Thereafter, the process returns to step S602. When the decimation rate becomes, for example, ¼, the sampling interval is set to four times of the sampling interval decided by the data acquisition method decision unit 16.

On the other hand, when the determination at step S606 is NO, that is, the performance data is unable to be interpolated, the process moves to step S608, and the data acquisition method decision unit 16 sets the decimation rate to the original decimation rate (the initial value=0). At step S608, the decimation rate may be set to be the decimation rate immediately before the process of step S612 was executed previous time. Thereafter, the process returns to step S602.

As described above, in the sixth embodiment, the data acquisition method decision unit 16 determines whether the performance data is data capable of being interpolated based on the latest X performance values (S606), and when determining that the performance data is data capable of being interpolated, increases the sampling interval for the performance value (S612). As described above, when the performance data is capable of being interpolated, the sampling interval is set long, the number of performance values to be acquired is minimized and the acquired performance values are interpolated. Thus, the load of hardware or communication is reduced.

The above sixth embodiment is able to be combined with any of the above first through fifth embodiments.

Seventh Embodiment

A description will next be given of a seventh embodiment with reference to FIG. 17.

Figure 17:
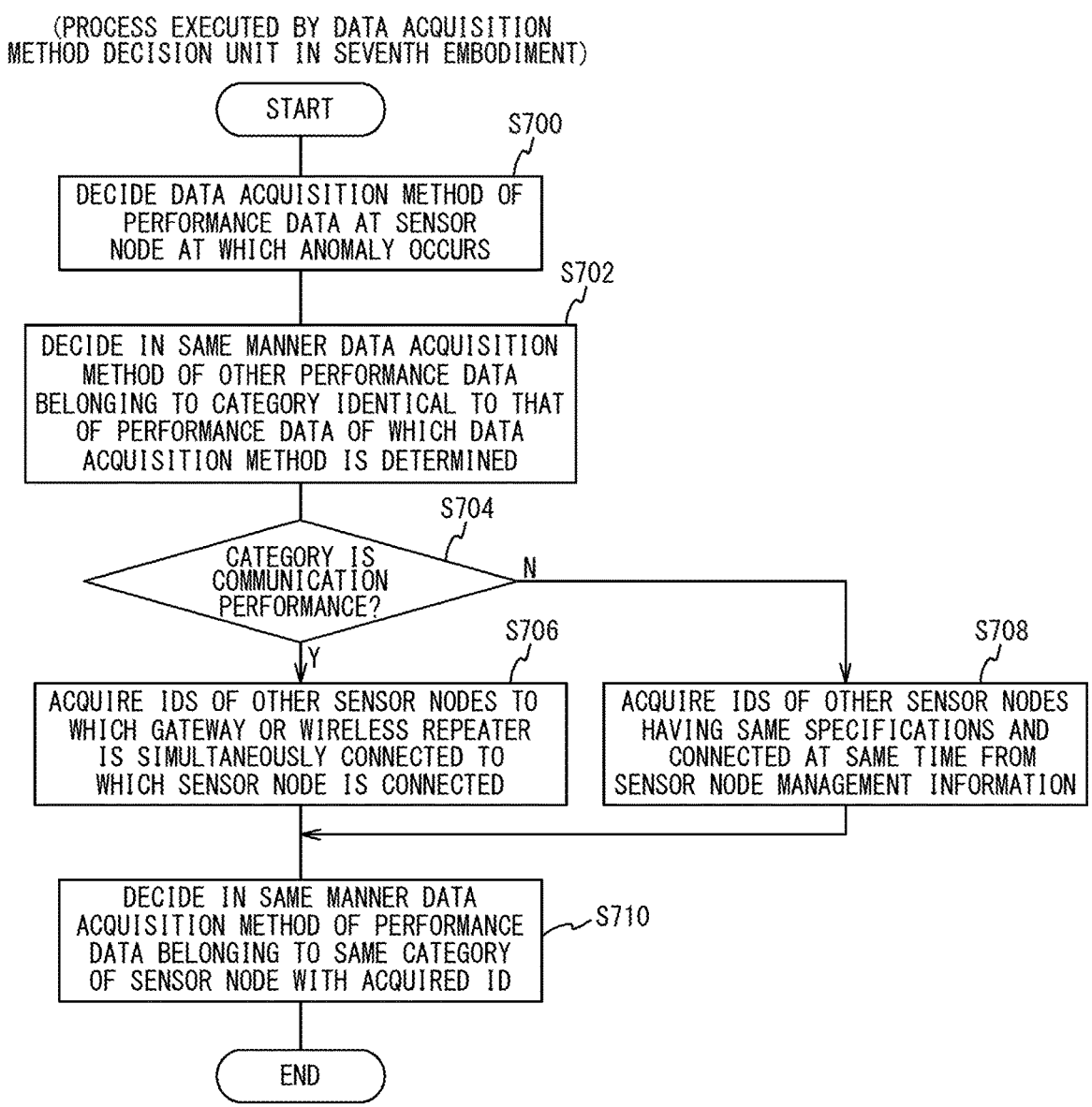
FIG. 17 is a flowchart of a process executed by the data acquisition method decision unit in a seventh embodiment.

FIG. 17 is a flowchart of the process executed by the data acquisition method decision unit 16 of the seventh embodiment. In the process of FIG. 17, at step S700, the data acquisition method decision unit 16 decides the data acquisition method for acquiring the performance data of the sensor node 70 at which an anomaly is present. The method of deciding the data acquisition method in this case is the same as that of the first embodiment described above.

Then, at step S702, the data acquisition method decision unit 16 decides in the same manner (together) the data acquisition method of other performance data belonging to the category identical to the category of the performance data of which the data acquisition method has been decided. For example, at step S700, when deciding the data acquisition method of the performance data (e.g., RSSI) belonging to the category "communication performance" of the sensor node (called a first sensor node), the data acquisition method decision unit 16 decides the data acquisition methods of the performance data (e.g., the LQ and the response time) that belong to the category "communication performance" of the first sensor node except the RSSI to the data acquisition method identical to the data acquisition method of the RSSI.

Then, at step S704, the data acquisition method decision unit 16 determines whether the category of the performance data is a communication performance. When the determination at step S704 is YES, the process moves to step S706 while the process moves to step S708 when the determination at step S704 is NO.

When the process moves to step S706 (when the category is a communication performance), the data acquisition method decision unit 16 acquires the node IDs of other sensor nodes to which the gateway or the wireless repeater to which the sensor node is being connected is simultaneously coupled. Thereafter, the process moves to step S710. On the other hand, when the process moves to step S708 (when the category is other than the communication performance), the data acquisition method decision unit 16 acquires from unillustrated sensor node management information the node ID of the sensor node having the same specifications and simultaneously connected. Thereafter, the process moves to step S710.

When the process moves to step S710 through step S706 or S708, the data acquisition method decision unit 16 decides in the same manner (together) the data acquisition method of the performance data belonging to the category identical to the category of the sensor node ID acquired at step S706 or S708. For example, it is assumed that the data acquisition method of the RSSI, which belongs to the category "communication performance", of the first sensor node is decided at step S700. In this case, the data acquisition method decision unit 16 adopts the data acquisition method identical to the data acquisition method for the first sensor node as the data acquisition method of the performance data belonging to the category "communication performance" of the second sensor node, which is connected at the same time as the first sensor node. For example, it is assumed that the data acquisition method of the performance data belonging to the category "hardware performance" of the first sensor node is decided at step S700. In this case, the data acquisition method decision unit 16 adopts the data acquisition method identical to the data acquisition method for the first sensor node as the data acquisition method of the performance data belonging to the category "hardware performance" of the second sensor node having the same specifications as the first sensor node.

The above configuration enables to the detection and the determination of performance deterioration and a failure with high accuracy according to the IoT environment because the data acquisition method decided for the sensor node at which an anomaly occurred is also used as the data acquisition method of the performance data belonging to the same category or the data acquisition method for a sensor node at which an anomaly identical or similar to the anomaly that occurred at the sensor node is likely to occur.

The seventh embodiment may be combined with at least one of the above first through sixth embodiments.

The above first through seventh embodiments describe a case where the sensor node 70 measures data relating to sewage, but do not intend to suggest any limitation. The sensor node 70 may measure other various data.

The above-described processing functions are implemented by a computer. In this case, a program in which processing details of the functions that a processing device (CPU) is to have are written are provided. The execution of the program by the computer allows the computer to implement the above described processing functions. The program in which the processing details are written can be stored in a storage medium (however, excluding carrier waves) capable of being read by a computer.

When the program is distributed, it may be sold in the form of a portable storage medium such as a DVD (Digital Versatile Disc) or a CD-ROM (Compact Disc Read Only Memory) storing the program. The program may be stored in a storage device of a server computer, and the program may be transferred from the server computer to another computer over a network.

A computer executing the program stores the program stored in a portable storage medium or transferred from a server computer in its own storage device. The computer then reads the program from its own storage device, and executes a process according to the program. The computer may directly read the program from a portable storage medium, and execute a process according to the program. Alternatively, the computer may successively execute a process, every time the program is transferred from a server computer, according to the received program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. An information processing device comprising:
a memory;
a communication interface for communicating with a sensor node, the sensor node including a sensor; and
a processor coupled to the memory and configured to:
determine first acquisition method of acquiring data using the sensor node;
acquire, from the sensor node through the communication interface, measurement data measured at the sensor node according to the first acquisition method and performance data relating to a performance of the sensor node, the performance data being obtained according to the first acquisition method;
determine a presence or absence of occurrence of an anomaly based on the acquired measurement data and/or the acquired performance data; and
determine a threshold value for each of a plurality of level ranges each indicating a degree of the performance of the sensor node based on data values of the acquired performance data and store the plurality of level ranges and the threshold value corresponding to each of the plurality of level ranges in a storage unit, wherein:
the processor is configured to determine, from among the plurality of level ranges stored in the storage unit, a level range in which a data value, which is newer than the data values, of the acquired performance data is included, and determine a second acquisition method of acquiring data using the sensor node, based on a combination of the determined level range and the presence or absence of occurrence of the anomaly, and
the processor is configured to send information indicating the second acquisition method to cause the sensor node to measure data according to the second acquisition method.

2. The information processing device according to claim 1, wherein
each of the first acquisition method and the second acquisition method includes at least one of a command for acquiring the measurement data and/or the performance data at the sensor node, a sampling interval at which the measurement data and/or the performance data is acquired at the sensor node, and a transmission interval at which the measurement data and/or the performance data is transmitted from the sensor node.

3. The information processing device according to claim 1, wherein
the processor is configured to repeatedly determine the threshold value for each of the plurality of level ranges at a predetermined timing.

4. The information processing device according to claim 1, wherein
the processor is configured to determine a failure based on a determination result of the presence or absence of occurrence of the anomaly, and output a result of determination of the failure.

5. The information processing device according to claim 1, wherein
the processor is configured to acquire a first set of data values of the performance data before use of the determined second acquisition method and a second set of data values of the performance data after use of the determined second acquisition method, and adjust the second acquisition method based on whether a level range in which the first set of data values is included differs from or identical to a level range in which the second set of data values is included.

6. The information processing device according to claim 5, wherein
the processor is configured to adjust the second acquisition method when a level range including a data value acquired according to the determined second acquisition method of the performance data deteriorates compared to a level range including a data value acquired according to the first acquisition method of the performance data.

7. The information processing device according to claim 1, wherein
the processor is configured to determine the threshold value based on a data value of the performance data acquired within a predetermined period of time including a time at which occurrence of an anomaly has been determined.

8. The information processing device according to claim 1, wherein
the processor is configured to acquire data values of the performance data when it is determined that an anomaly has occurred, and determine the threshold value based on a number of acquisition with respect to each of the data values.

9. The information processing device according to claim 1, wherein
the processor is configured to receive an input of a third acquisition method that a user desires, and determine the second acquisition method of acquiring data using the sensor node based on the third acquisition method that the user desires.

10. The information processing device according to claim 1, wherein
when each of the first acquisition method and the second acquisition method includes a sampling interval at which the performance data is acquired at the sensor node, the processor is configured to determine whether the performance data is data capable of being interpolated, and increase the sampling interval at which the performance data is acquired when the performance data is the data capable of being interpolated.

11. The information processing device according to claim 10, wherein
the processor is configured to calculate an approximate curve of data values of the performance data acquired within a predetermined period of time, and determine whether the performance data is the data capable of being interpolated based on whether a determination coefficient of the approximate curve is equal to or greater than a threshold value.

12. The information processing device according to claim 1, wherein
the processor is configured to, when determining a fourth acquisition method of first performance data of a first sensor node, adopt a fifth acquisition method identical to the fourth acquisition method of the first performance data of the first sensor node as a sixth acquisition method of the first performance data of a device relating to the first sensor node and/or as a seventh acquisition method of second performance data relating to the first performance data of the first sensor node.

13. An information processing method comprising:
determining a first acquisition method of acquiring data using a sensor node including a sensor;

acquiring, from the sensor node through a communication interface for communicating with the sensor node, measurement data measured at the sensor node according to the first acquisition method and performance data relating to performance of the sensor node, the performance data being obtained according to the first acquisition method;

determining a presence or absence of occurrence of an anomaly based on the acquired measurement data and/or the acquired performance data; and determining a threshold value for each of a plurality of level ranges each indicating a degree of the performance of the sensor node based on data values of the acquired performance data and storing the plurality of level ranges and the threshold value corresponding to each of the plurality of level ranges in a storage unit, wherein the determining of the first acquisition method includes determining, from among the plurality of level ranges stored in the storage unit, a level range in which a data value, which is newer than the data values, of the acquired performance data is included determining a second acquisition method of acquiring data using the sensor node, based on a combination of the determined level range and the presence or absence of occurrence of the anomaly, and sending information indicating the second acquisition method to cause the sensor node to measure data according to the second acquisition method.

14. A non-transitory computer-readable storage medium storing a program that causes a computer to execute a process, the process comprising:

determining a first acquisition method of acquiring data using a sensor node including a sensor;

acquiring, from the sensor node through a communication interface for communicating with the sensor node, measurement data measured at the sensor node according to the first acquisition method and performance data relating to performance of the sensor node, the performance data being obtained according to the first acquisition method;

determining a presence or absence of occurrence of an anomaly based on the acquired measurement data and/or the acquired performance data; and determining a threshold value for each of a plurality of level ranges each indicating a degree of the performance of the sensor node based on data values of the acquired performance data and storing the plurality of level ranges and the threshold value corresponding to each of the plurality of level ranges in a storage unit, wherein the determining of the first acquisition method includes determining, from among the plurality of level ranges stored in the storage unit, a level range in which a data value, which is newer than the data values, of the acquired performance data is included determining a second acquisition method of acquiring data using the sensor node, based on a combination of the determined level range and the presence or absence of occurrence of the anomaly, and sending information indicating the second acquisition method to cause the sensor node to measure data according to the second acquisition method.

* * * * *